(12) United States Patent
Macagnano et al.

(10) Patent No.: US 11,200,754 B1
(45) Date of Patent: Dec. 14, 2021

(54) EXTENDED REALITY ENVIRONMENT GENERATION

(71) Applicant: ACCENTURE GLOBAL SOLUTIONS LIMITED, Dublin (IE)

(72) Inventors: Dario Macagnano, Melbourne (AU); Christophe Bourdeau, Port Kennedy (AU); Reuben Coutinho, Abbotsford (AU); Lia Donaldson, Nollamara (AU); Sing Le, Victoria (AU); Shan He, Auckland (NZ)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/131,283

(22) Filed: Dec. 22, 2020

(51) Int. Cl.
*G06T 19/20* (2011.01)
*G06T 17/00* (2006.01)
*G01S 19/51* (2010.01)

(52) U.S. Cl.
CPC ............. *G06T 19/20* (2013.01); *G01S 19/51* (2013.01); *G06T 17/00* (2013.01); *G06T 2200/24* (2013.01); *G06T 2210/04* (2013.01); *G06T 2210/12* (2013.01); *G06T 2219/2004* (2013.01); *G06T 2219/2016* (2013.01)

(58) Field of Classification Search
CPC ..... G06T 19/20; G06T 17/00; G06T 2200/24; G06T 2210/04; G06T 2210/12; G06T 2219/2004; G06T 2219/2016; G01S 19/51
See application file for complete search history.

(56) References Cited

U.S. PATENT DOCUMENTS

| 10,369,472 | B1* | 8/2019 | Mattar | G06N 20/00 |
| 2010/0229113 | A1* | 9/2010 | Conner | G06Q 10/10 |
| | | | | 715/771 |
| 2021/0027537 | A1* | 1/2021 | Olah-Reiken | G06T 19/003 |

* cited by examiner

*Primary Examiner* — Xilin Guo
(74) *Attorney, Agent, or Firm* — Mannava & Kang, P.C.

(57) ABSTRACT

Examples of extended reality environment generation are provided. The techniques for extended reality environment generation may include receiving digital content and metadata associated with a physical environment and generating a digital layout of the physical environment by scaling the received digital content. Next, Global Positioning System (GPS) coordinates and functional coordinates are associated with placement locations in the digital layout. Further, a pre-defined placement of an asset is received in the digital layout and a set of GPS coordinates and a set of functional coordinates are identified for the asset placed in the digital layout. Next, the set of GPS coordinates and the set of functional coordinates are associated with metadata of the asset and the asset stored along with the metadata as a model linked with the digital layout. Further, an extended reality environment for the physical environment is generated with the assets by extracting the model.

20 Claims, 25 Drawing Sheets

| Field | Type | Description |
|---|---|---|
| id | string | Unique ID for floorplan |
| environmentX | Model:v | Horizontal view of the floorplan. (:v indicates that the model must include a version number) |
| environmentPositionX | Vector3 | Position of floor plan X relative to global space |
| gridSize | number | The length of 1 grid unit (X and Z will inherit the same value, so all grids will be square) |
| environmentSize | number | The total length of the floorplan (X and Z will inherit the same value, so all floorplans will be square) |
| sceneModels | SceneModels[] | All models that are placed in the floorplan / schematic |
| gps | object | GPS co-ordinates of the real world asset to align localisation from the digital asset placement to real world location |
| funcLoc | object | Functional location of the uploaded floorplan / schematic to align localisation |
| anchorPoint | Vector4 | (x, y, z, w) definition of how the environment sits in world plane |

FIG. 6A

| Field | Type | Description |
|---|---|---|
| id | string | Unique ID for model placed in a floorplan |
| Model | Model:v | Asset that is placed in the linkage. The model must include a version number |
| selectedGridsIdx | [Vector2, Vector2] | Bounding area coordinates |
| rotation | Vector3 | Euler XYZ rotation of the model (The model will almost always only revolve around the Y axis since we are only working from 1 plane) |
| scale | number | The scalar value for scaling the model to the bounding box |
| levelYOffset | number | The offset distance from ground level (ground level defined by Y coordinate on environment metadata) |

FIG. 6B

EXTENDED REALITY ENVIRONMENT GENERATION

BACKGROUND

Planning and developing physical spaces such as, for example, the interiors of homes and offices, is a lucrative trade, which has grown from strength to strength with time. For instance, decorating interiors of homes and planning the set up of office spaces is a valid career that many opt for. In recent times, space planning and development has extended to various other types of physical spaces, including factories, power plants, and other such industrial spaces.

Conventionally, during the planning and setting up of a physical space, a user manually observes the space and its surrounding, and accordingly plans the layout of the space. However, in such manual planning of the physical space, even a minor change, such as a small change in the space, or minor errors in estimation of the space may amount to significant loss of time, effort, and resources. Therefore, computer-implemented tools have been developed that assist in the assessment, planning, and development of physical spaces. Such computer-implemented tools can generate a replica of the physical space, referred to as an extended reality environment for the physical space, which can then be used to simulate the physical space and plan and model the same. The extended reality environment referred herein can be related to, for example, but not limited to, digital twin, assets tied to, real-world application, connected worker, field inspections, sensor readings, other such applications, and/or the like.

Use of such machine-driven tools may address the drawbacks associated with manual planning. However, these tools continue to suffer from pitfalls. For example, conventional tools for planning physical spaces usually source data from limited sources, which may not be frequently updated. In a scenario where the physical space may have undergone some significant structural changes, while the data source remains dated, the planning of the physical space by the tool may be inaccurate and also involve a considerable amount of loss of time, effort, and resources.

Furthermore, convention tools usually are unable to consider certain assets, such as moveable furniture in a home or office setup or movable machinery or equipment, while planning and whether the assets can be increased, decreased, or moved in the physical space for optimization. In other words, conventional tools for space planning and development only document the physical space for simulation and not the assets therein.

Accordingly, a technical problem with conventional tools that generate extended reality environments, such as for a physical space, is that they may be inefficient or inaccurate or both. In addition, as explained above, such tools may be wasteful and may lead to unnecessary expenditure of time and resources, which may ultimately culminate into considerable monetary losses.

BRIEF DESCRIPTION OF DRAWINGS

FIGS. 6A-6B illustrates data structure of components of the extended reality environment generation system according to an example embodiment of the present disclosure.

DETAILED DESCRIPTION

Figure 1:
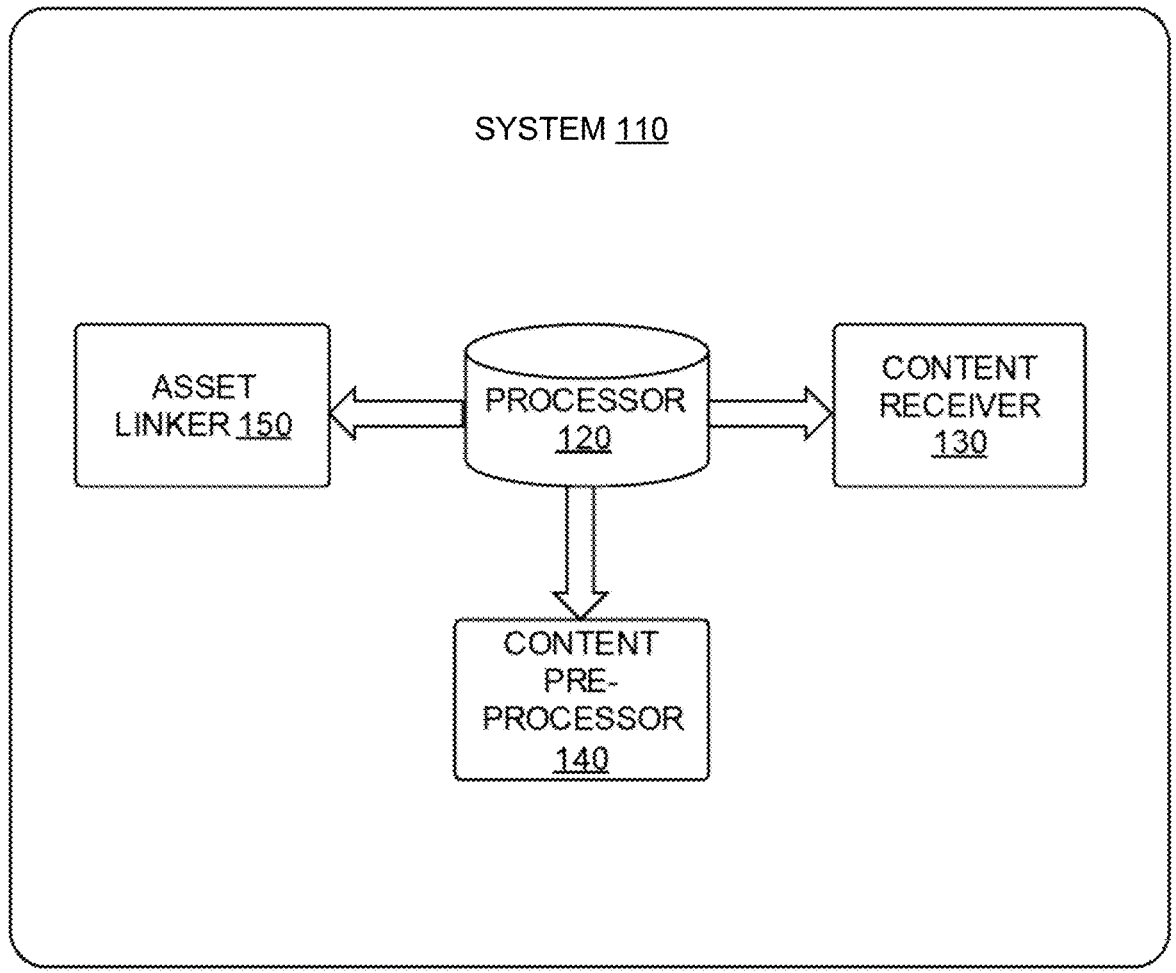
FIG. 1 illustrates a diagram for an extended reality environment generation system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes a system and method for generation of an extended reality environment for a physical environment. The techniques for extended reality environment generation of the present disclosure may take into account various factors, including assets in the physical environment or space, to generate an efficient and accurate extended reality environment. Accordingly, the techniques for extended reality environment generation, as proposed in the present disclosure, utilize data of diverse format and from diverse sources to overcome barriers in generating the extended reality environment for the physical environment due limited information. Therefore, the techniques of the present disclosure may ensure effectiveness, efficiency, and completeness, both, qualitatively as well as quantitatively planning and developing of the physical environment by generating an accurate simulation of the physical environment. Additionally, the simulation may facilitate in obtaining an accurate 3D representation of the physical environment along with the assets illustrated therein.

The physical environment may be understood as a physical premise with one or more assets positioned in the premise. For example, the physical environment may be a factory floor with assets, such as machines, equipment, and processing workstations in the physical environment of the factory floor. Further, an extended reality environment for the physical environment may be understood as a substantially exact depiction of the physical environment with the assets positioned therein. In case of factory floor as physical environment, a digital representation of the factory floor with a replica of exact placement of the machines, the equipment, and the processing workstations similar to the actual factory floor may be an extended reality environment for the factory floor. In addition, the extended reality environment may represent as a scaled down version of the physical environment as digitally replicating exact dimensions of the physical environment may be unsuitable for conveniently viewing the physical environment, for example, on a display of a computing system. In some example embodiments, the extended reality environment may include a digital twin corresponding to the physical environment. In some example embodiments, the extended reality environment may correspond to digital representation of, for example, but not limited to, physical objects, sensors, workers, field components, field devices, sensor data readings, real-world applications, and/or the like.

As an example, the techniques of extended reality environment generation as envisaged by the present disclosure are described with reference to a system for extended reality environment generation. In said example, the system may include a processor, a content receiver, content pre-processor and an asset linker. The processor may be coupled to the content receiver, the content pre-processor, and the asset linker. The system may receive digital content along with metadata associated with the physical environment via the content receiver. The digital content may be understood as digital images, videos, and other representative digital information of the physical environment. Further, the metadata may be understood as data associated with the received digital content that may be utilized in interpretation of the digital content associated with the physical environment.

The content pre-processor may generate a digital layout of the physical environment by performing pre-processing on the received digital content. In an example, the pre-processing may include scaling down of the received digital content and creating a digital layout corresponding to the physical environment. Further, the content pre-processor may allocate various coordinates to placement locations in the digital layout, such that each node in the digital layout may be understood as a function of the coordinates. The content pre-processor may, for instance, associate Global Positioning System (GPS) coordinates and functional coordinates with placement locations in the digital layout, where the GPS coordinates and the functional coordinates represents actual locations in the physical environment represented in the digital layout of the physical environment.

The asset linker may receive a pre-defined placement of an asset in the digital layout by a user. The user may define the placement of the asset in the digital layout corresponding to the placement of the asset in the physical layout. Further, after receiving the pre-defined placement of the asset location, coordinates may be identified for the pre-defined placement and the coordinates may be associated with the metadata of the digital content. In an example, a set of GPS coordinates and a set of functional coordinates may be identified for the asset placed in the digital layout. As mentioned previously, the GPS coordinates indicate actual location of the asset in the physical environment represented in the digital layout, and the functional coordinates indicate relative locations of assets with respect to each other in the physical environment represented in the digital layout.

Accordingly, in the generated digital layout, the asset placement and coordinates may be linked to the metadata and stored as a model of the physical environment. The model may be understood as a three-dimensional (3D) representation, for example, of placement, of the asset in the physical environment and indicated in the digital layout. Further, the model may be extracted to obtain extended reality environment for the physical environment. The extended reality environment may be used for diverse applications, such as planning modifications to the physical environment and addition of assets to the physical environment.

The embodiments for the extended reality environment generated presented herein are illustrative in nature and should be treated as such. For the sake of brevity and technical clarity, the description of the extended reality environment generation system may be restricted to few embodiments, however, to a person of ordinary skill in the art, it should be clear that the system may be used for the fulfillment of various extended reality environment generation requirements other than those mentioned hereinafter.

FIG. 1 illustrates a system 110 for extended reality environment generation (referred to as system 110 hereinafter), according to an example implementation of the present disclosure. In an example, the system 110 may include a processor 120. The processor 120 may be coupled tithe content receiver 130, the content pre-processor 140 and the asset linker 150.

The content receiver 130 may receive digital content and metadata associated with a physical environment. The digital content may represent various views and available scattered information may pertain to the physical environment, such as images of the physical environment from different views and different sources such as images and documents. The digital content may be two-dimensional images, two-dimensional videos, 360 degree images, CAD files, 3D models, NAVIS works, satellite images, asset bundles, point cloud data or a combination thereof. Further, after receiving the digital content, the digital content may be converted to a predefined format. The predefined format may be understood as a format, such as JSON that may be understandable and easy to process by the system 110. Since, the digital content received may be from diverse sources and different files may be in different format, the convention of the digital content with the metadata to the predefined format facilitates in similar processing of the digital content as a single entity.

The content pre-processor 140 may generate a digital layout of the physical environment by scaling the received digital content. The digital layout may be a multi-grid matrix representing scaled-down version of the physical environment. Details of the digital layout have been discussed in later paragraphs. The content pre-processor 140 may also associate Global Positioning System (GPS) coordinates and functional coordinates with placement locations in the digital layout. The GPS coordinates represent actual location of an asset in the digital layout corresponding to the physical environment and the functional coordinates correspond to relative locations of assets in the physical environment with respect to each other represented in the digital layout. Since, the digital layout is a multi-grid matrix, a node of each grid in the multi-grid matrix may be assigned the GPS coordinate and the functional coordinate for the grid.

The asset linker 150 may receive a pre-defined placement of an asset in the digital layout. A user may define the pre-defined placement of the assets along 3 dimensional (3D) planes, for example, along XY, YZ and XZ planes. Further, the user may define the pre-defined placement of the asset by plotting a boundary box for the asset in the digital layout and by providing dimensions of the asset. The received dimensions may be scaled appropriately based on scaling of the digital layout. The pre-defined placement corresponds to actual placement of the asset in the physical environment and relative placement of the asset in the digital layout. Further, the asset linker may identify a set of GPS coordinates and a set of functional coordinates for the asset placed in the digital layout and associate the set of GPS coordinates and the set of functional coordinates with metadata of the asset. The asset linker may also store the asset along with the metadata as a model linked with the digital layout. The model corresponds to three-dimensional (3D) placement of the asset in the digital layout and the physical environment. The asset linker 150 may further generate an extended reality environment for the physical environment with the assets by extracting the model.

Figure 2:
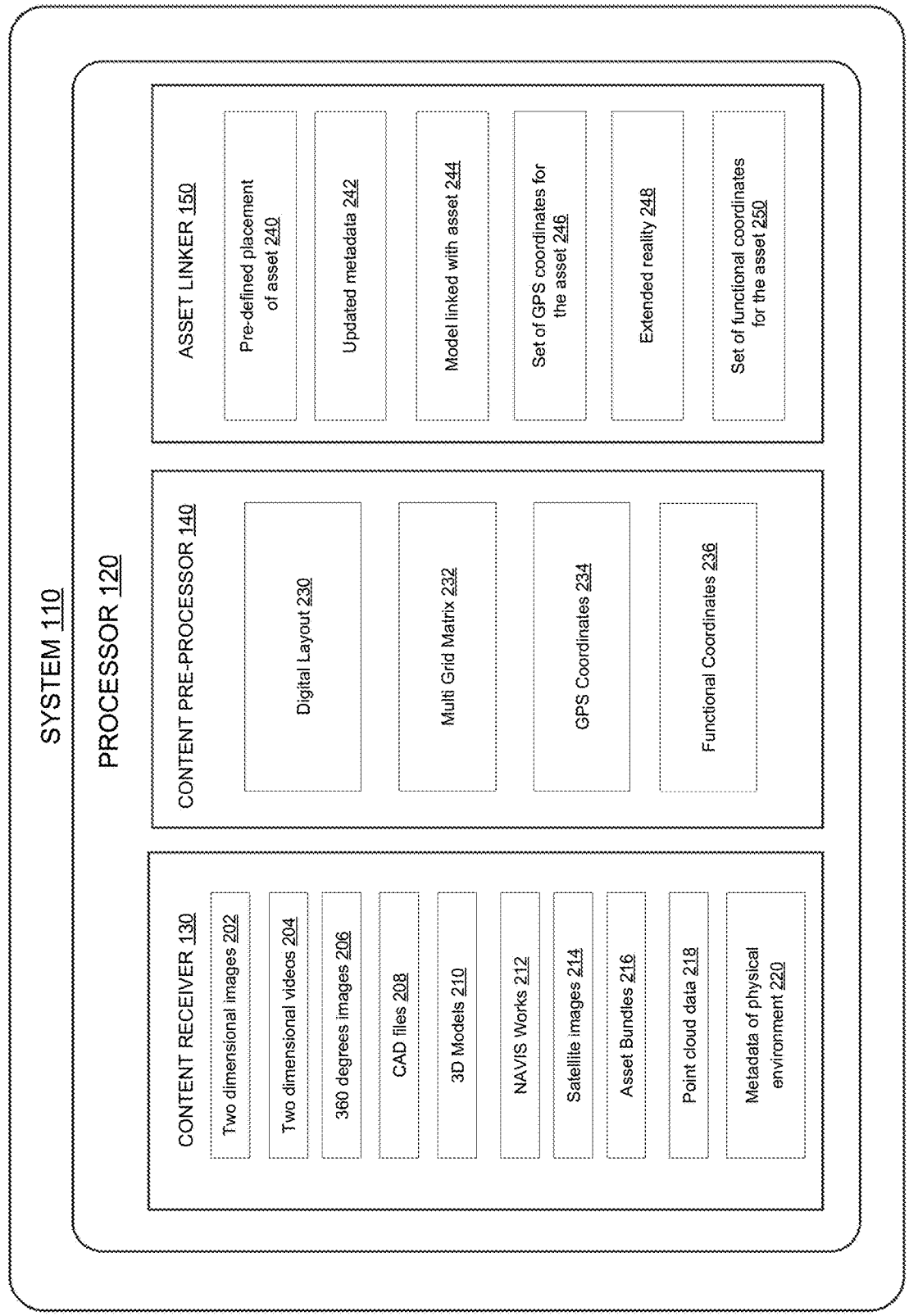
FIG. 2 illustrates various components of extended reality environment generation system, according to an example embodiment of the present disclosure.

FIG. 2 illustrates various components of the extended reality environment generation system 110 according to an example embodiment of the present disclosure. For purposes of brevity, the extended reality environment generation system 110 may be interchangeably referred hereinafter as the system 110 at various instances throughout the description. In an example, the system 110 may include a processor 120. The processor 120 may be coupled to the content receiver 130, the content pre-processor 140 and the asset linker 150.

The content receiver 130 may receive digital content and metadata associated with a physical environment. The digital content may represent various views and available scattered information may pertain to the physical environment, such as images of the physical environment from different views and different sources such as images and documents. The digital content may include two-dimensional images 202, two-dimensional videos 204, 360 degree images 206, CAD files 208, 3D models 210, NAVIS works 212, satellite images 214, asset bundles 216, point cloud data 218, metadata of physical environment 220, and/or a combination thereof.

In some example embodiments, upon receiving the digital content, the digital content may be converted to a predefined format. The predefined format may be understood as a format, such as JSON that may be understandable and easy to process by the system 110. Since, the digital content received may be from diverse sources and different files may be in different format, the convention of the digital content with the metadata to the predefined format facilitates in similar processing of the digital content as a single entity.

The content pre-processor 140 may generate a digital layout 230 of the physical environment by scaling the received digital content. In some examples, the digital layout may be associated to a multi-grid matrix 232 representing scaled-down version of the physical environment. In some example embodiments, based on available layout (for example, generated based on uploaded digital content), total available physical space in the physical environment may be interpreted and scaled to generate a scaled-down matrix to represent the physical space. Further, the scaled-down matrix may be understood as digital representation of the physical space.

The content pre-processor 140 may also associate Global Positioning System (GPS) coordinates 234 and functional coordinates 236 with placement locations in the digital layout. In some examples, the GPS coordinates 234 may represent actual location of an asset in the digital layout 230 corresponding to the physical environment. Further, in some examples, the functional coordinates 236 may correspond to relative locations of assets in the physical environment with respect to each other represented in the digital layout 230. According to some examples, providing GPS location of the assets may include specifying latitude and longitudes of each node in the grid, such that each node is indicative of GPS location in the physical space. Thus, the GPS location is absolute location of each node. Further, the functional location is indicative of relative position of each node in the physical space with respect to another node in the physical space. Thus, according to some embodiments, the functional location may be a relative value. Since, the digital layout is a multi-grid matrix, a node of each grid in the multi-grid matrix may be assigned the GPS coordinate and the functional coordinate for the grid.

According to an example embodiment, the asset linker 150 may receive a pre-defined placement 240 of an asset in the digital layout 230. In an example, a user may define the pre-defined placement of the assets along 3 dimensional (3D) planes, for example, along XY, YZ and XZ planes. Further, the user may define the pre-defined placement 240 of the asset by plotting a boundary box for the asset in the digital layout 230 and by providing dimensions of the asset. Various examples of defining the pre-defined placement 240 of the assets based on user inputs are described later in reference to FIGS. 5A-5I. The received dimensions may be scaled appropriately based on scaling of the digital layout. According to some examples, the pre-defined placement 240 may correspond to actual placement of the asset in the physical environment and relative placement of the asset in the digital layout 230.

In an implementation of the present subject matter, the digital layout 230 may be a hierarchical layout (for instance, including a hierarchy of planes) such as, a world plane, an environment plane, and assets positioned with respect to the world plane and the environment plane. Details of the hierarchical layout have been elaborated in FIG. 4D.

Further, in accordance with some example embodiments, scaling for the placement of the asset in the digital layout may be executed based on various scenarios, such as a scenario where a dimension of the boundary specified by the user is larger, equal or smaller than dimension of the digital layout 230. Detailed description of the scaling has been provided in subsequent paragraphs.

In an exemplary implementation of the present subject matter, the scaled-down matrix may be over-layered on the uploaded layout and the user may be prompted to specify location of existing assets in the physical space of the physical environment onto the digital replica, for example, the digital layout 230 of the physical space. The user may specify the location by putting a pin on the digital replica of the physical space or the use may define the location by drawing a boundary.

Further, the asset linker 150 may identify a set of GPS coordinates 246 and another set of functional coordinates 250 for the asset placed in the digital layout 230. In some examples, these coordinates may be associated with metadata of the asset to generate update metadata 242. In some examples, the asset linker 150 may also store the asset along with the metadata as a model 244 linked with the asset in the digital layout 230. The model can correspond to three-dimensional (3D) placement of the asset in the digital layout 230 and the physical environment. The asset linker 150 may further generate an extended reality environment 248 of the physical environment with the assets by extracting the model 244. As described earlier, the extended reality environment generated by the extended reality environment generation system 110 may be representative of, for example, but not limited to, a digital twin indicative of a digital representation of the physical environment and/or assets and its operations in the physical environment. In some example embodiments, the extended reality environment may correspond to digital representation of, for example, but not limited to, physical objects, sensors, workers, field components, field devices, sensor data readings, real-world applications, and/or the like.

In some example embodiments, as the user specifies the location, metadata associated with the asset may be captured by the asset linker 150. As described earlier, the metadata may include the GPS coordinates 234 and the functional coordinates 236 associated with the location of the entity as specified by the user. Thus, the asset linker 150 may associate GPS and functional coordinates of the asset and can also obtain a digital replica of the entity in the digital replica of the physical space. Accordingly, exact replica of the entity is obtained in digital space as well and this replica can be used for various applications.

Figure 3A:
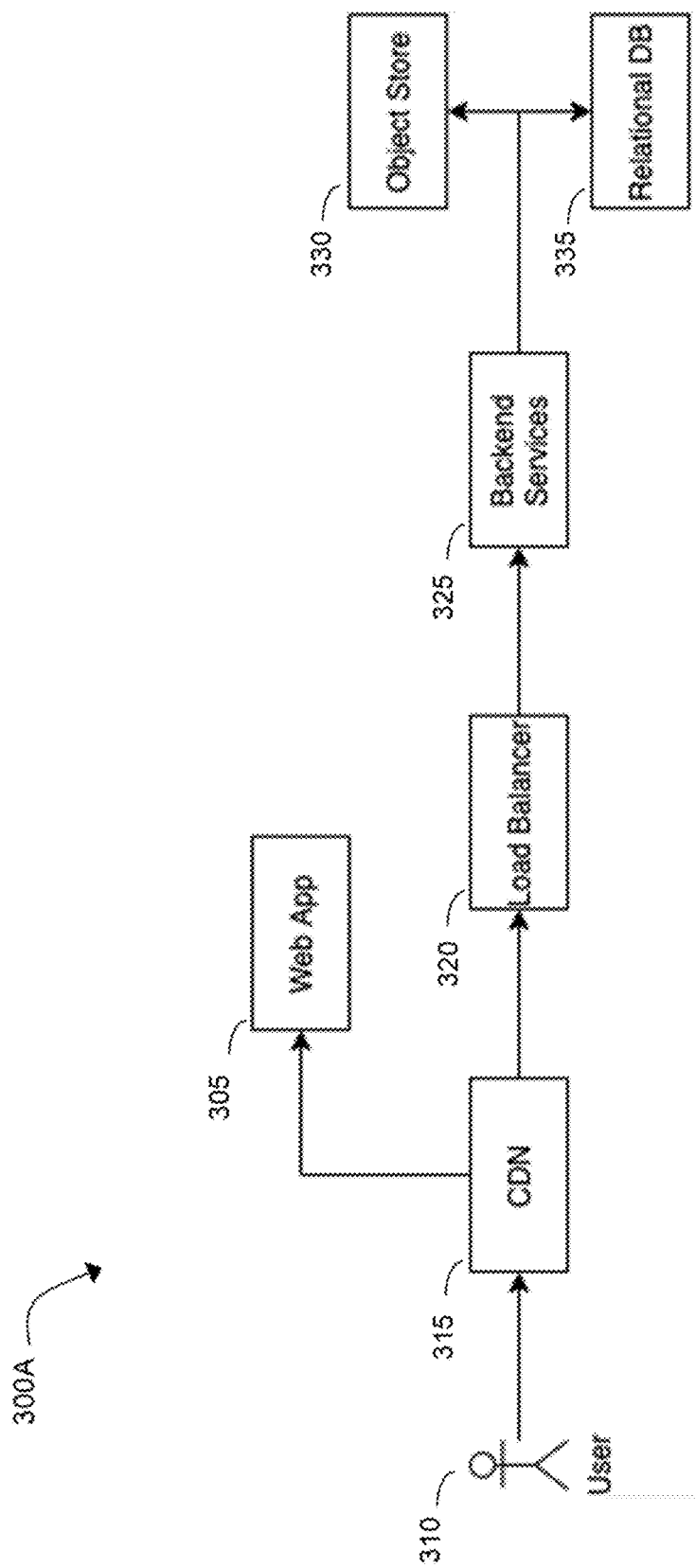
FIGS. 3A-3B illustrates example architectures that may enable an operation of the extended reality environment generation system, according to an example embodiment of the present disclosure.
Figure 3B:
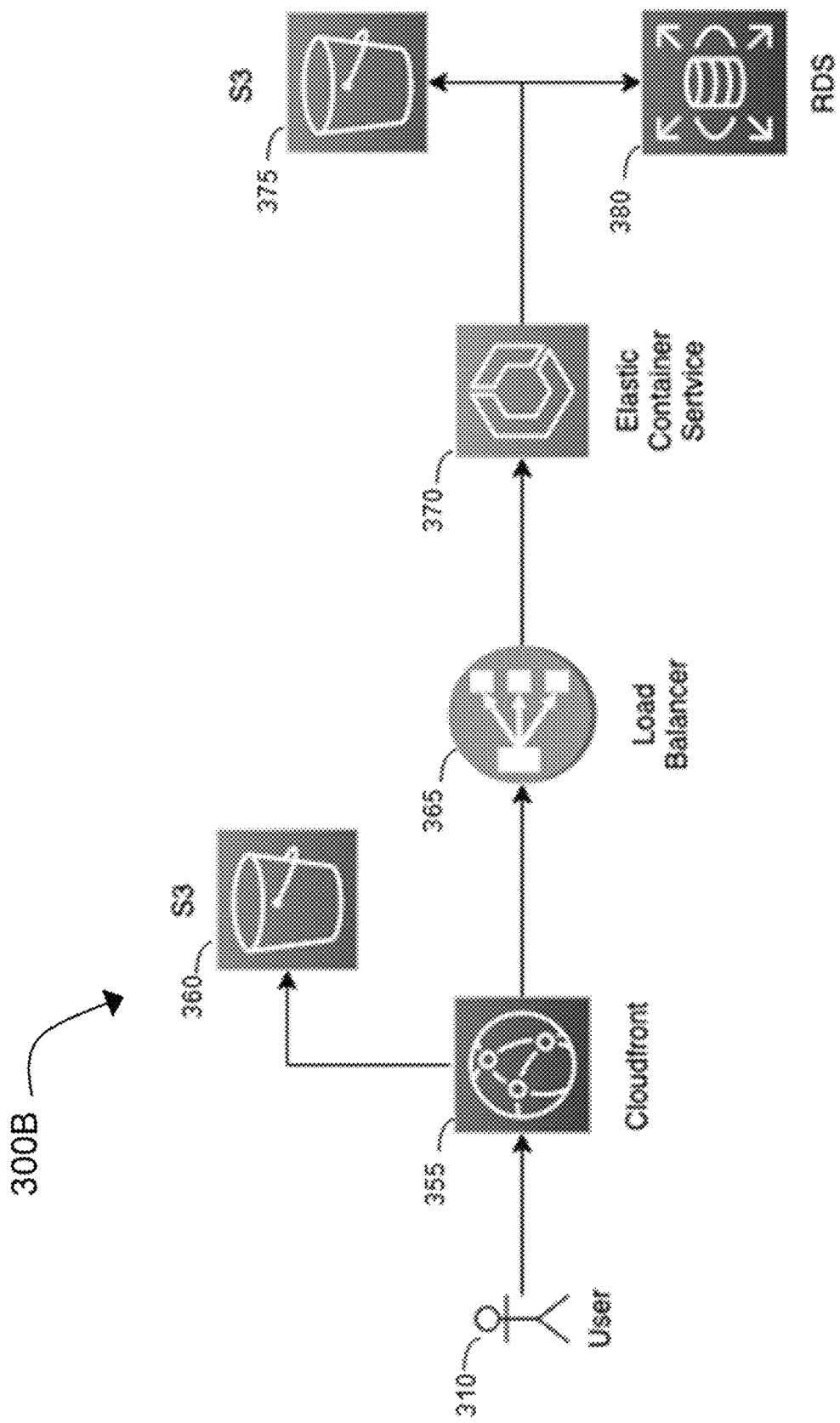

FIGS. 3A-3B illustrates example architectures 300A and 300B that may enable an operation of the extended reality environment generation system 110, according to an example embodiment of the present disclosure. In some examples, a web application 305 may be utilized by a user 310 for providing various inputs that may be required for the operation of the extended reality environment generation system 110. In some example embodiments, the web application 305 may render a graphical user interface that may be utilized by the user 310 for creating and/or modifying uploaded assets. In some examples, these assets may be utilized for creating a schematic floor plan-based scene. Further, the schematic floor plan-based scene may be exported from the web application 305. Various examples of the user interface rendered by the web application 305 are described later in reference to FIGS. 5A-5J.

In some example embodiments, as illustrated in FIG. 3A, the architecture may include a content delivery network (CDN) 315, a load balancer 320, a backend service a backend service 325, an object store 330, and a relational database 335. In an example, the web application 305 may be supported by the CDN 315. In some examples, the CDN 315 may include distributed servers that may be connected over a network and may support fast, reliable, cheap, and secure delivery of web content on various devices. In an example, the CDN 315 and the load balancer 320 may allow for performance improvements while handling high volumes of data.

In an example embodiment, the CDN 315 may cache content at a server that may be located close to a user's geographic region to reduce latency between requesting and receiving the model. Further, the load balancer 320 may distribute web traffic from different users and may balance the load across multiple servers in different regions ensuring low latency. According to some example embodiments, the CDN 315 and/or the load balancer 320 may be implemented by utilizing various known technologies. For instance, as illustrated in FIG. 3B, in some examples, the CDN 315 may be based on AWS Cloud Front 350. Further, as illustrated in FIG. 3B, in some examples, the load balancer 320 may be implemented based on AWS Elastic Load Balancer 365.

As illustrated, the architecture 300A may include the object store 330 for storing one or more asset files. In some examples, as illustrated in FIG. 3B, the object store 330 may be based on AWS S3 (360, 375). In some example embodiments, a file store may be utilized to store asset files. In an example, the file store may be implemented by utilizing AWS FileStorage.

According to some example embodiments, the relational database 335 may store metadata corresponding to various assets captured by the asset linker 150 of the extended reality environment generation system 110. In some examples, the relational database 335 may be based on any of, but not limited to, mySQL, PostgresSQL, AWS Aurora, and other such databases. While not illustrated in FIG. 3A, however, in some example embodiments, the architecture 300A may also include non-relational databases for storing one or more asset files. For instance, in some example embodiments, the non-relational databases may be based on, but not limited to, AWS DynamoDB, MongoDB, etc.

As illustrated in FIG. 3A, in some example embodiments, the architecture 300A may include the backend services 325 that may include one or more services that may be used for running various application, for example, the web application 305. In some example embodiments, these services may containerized by utilizing, for instance, but not limited to, Dockers, and may be managed by a container management too such as, but not limited to, AWS ECS, Kubernetes etc. As may be understood, containerization of the applications and/or services may involve packaging up of software code and all its dependencies so as to enable fast and reliable execution and transaction of these applications and/or services from one computing environment to another. In other words, containerization of these applications may involve packaging these applications into an image file which can be represent a lightweight, standalone, executable package of software that includes everything needed to run an application: code, runtime, system tools, system libraries and settings. In some example embodiments, as illustrated in FIG. 3B, the back end services 325 may be containerized based on Amazon's Elastic Container Service (ECS) 370.

It may be understood, that while FIG. 3B illustrates various technologies that may be utilized for implementing various components corresponding to the architecture for the extended reality environment generation system 110, however one of ordinary skilled in the art may appreciate that other technologies may be utilized to implement various components related to the architecture of the extended reality environment generation system 110.

Figure 4A:
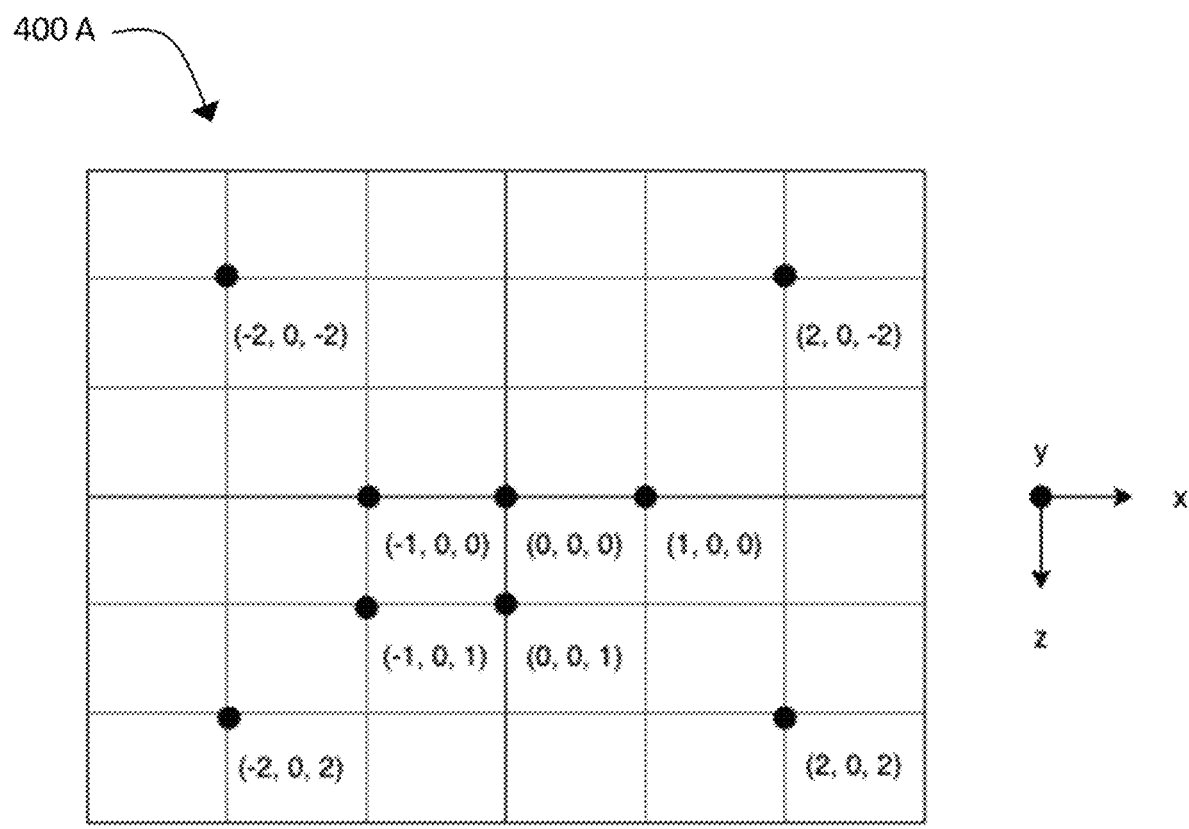
FIGS. 4A-4D illustrates digital layout in the extended reality environment generation system, according to an example embodiment of the present disclosure.
Figure 4B:
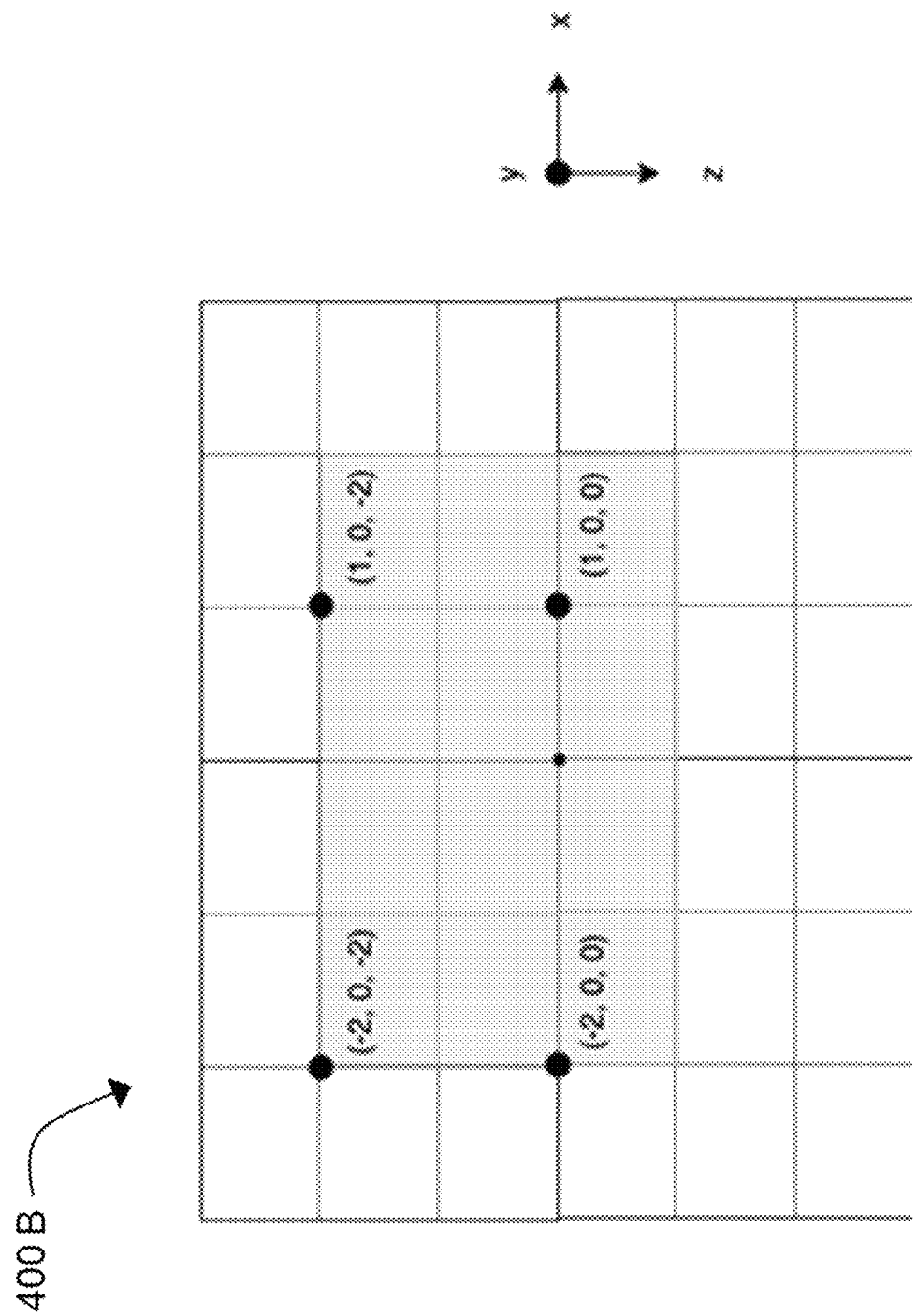
Figure 4C:
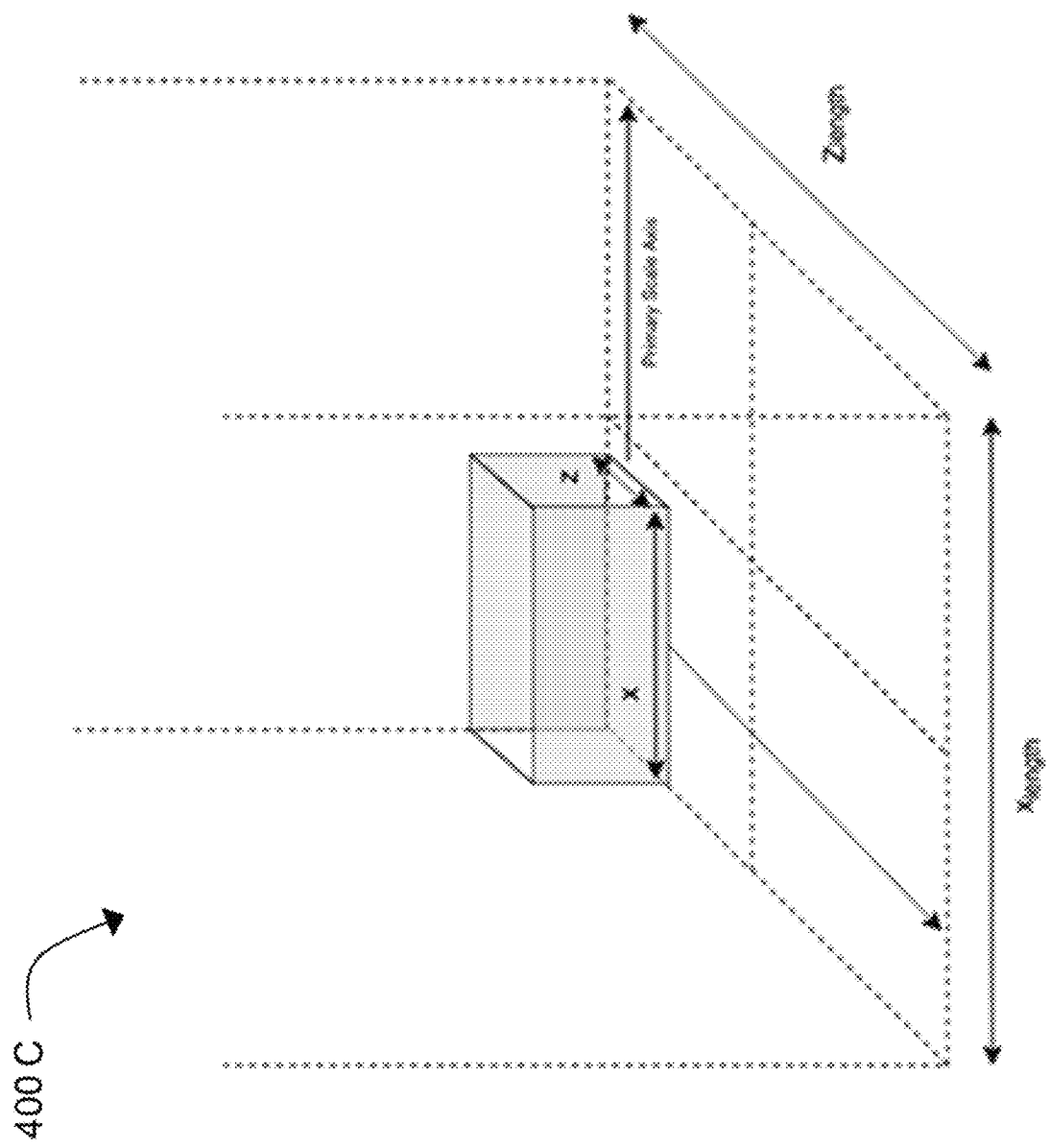

FIGS. 4A-4D illustrates a digital layout representation 400A that may be generated by the extended reality environment generation system 110, according to an example embodiment of the present disclosure. FIGS. 4A-4C illustrates views 400A, 400B, and 400C related to: (a) multi-grid matrix for the digital layout 230 and (b) specification of dimensions of assets in the digital layout 230 by the user and used by the asset linker 150. The asset linker 150 may initiate building of a digital layout of a 3D environment with a plane along the XZ axis overlaid with a grid. The grid coordinate is represented by the position of the top left corner of the square, as shown in FIG. 4A. The coordinate of the square represents the square as a whole. In some examples, granularity of operation of the asset linker 150 may be dependent on the grid size specified on initial setup. In the example of FIGS. 4A-4C, the grid size is 1×1, which represents a 1 m×1 m area in the physical environment. According to an example embodiment, as a user highlights areas on the ground boxes, the asset linker 150 captures and stores the bounding points of the highlighted area. The points used to represent the grid are specified in the top left corner of the square, as shown in FIG. 4B.

In an implementation of the present subject matter, three different scaling scenarios may exist, each using the highlighted box coordinates and bounding box as references regarding the scaling. The scaling axis that will provide the scalar value for scaling may be a primary scale axis. The other 2 axes may be called secondary scale axis as they will follow the same scalar value as the primary scale axis. In some examples, depending on a use case, the calculation for the primary scale axis and scale value may be different. In some examples, a heuristic that is followed corresponding to the bounding box of the model may be always smaller than the highlighted area. FIG. 4C illustrates an example of scaling example where the asset highlighted by the user is smaller than the layout area in terms of x_length and z_length.

In an example scenario, when the dimensions both sides of the digital layout model are smaller than the highlighted box, primary scale axis may be calculated by taking the smaller value from (z_length)−x OR (z_length−z). Accordingly, scale factor is >1. In another example scenario, when the dimension of one side of the digital layout is larger than the highlighted box and the other is smaller, primary scale axis is always the larger side. Accordingly, the scaling will be along the primary scale axis and the bounding box of the model will be the same as the highlighted box length, i.e., the bounding box length=highlighted box length along the primary axis, the rest of the axes scale accordingly. Further, the scale factor is <1. In another example scenario, when both sides of the digital layout are larger than the highlighted box, the primary scale axis is calculated by taking the larger value from: (x−x_length) OR (z−z_length). Accordingly, the scale factor is <1. The present subject matter uses scalar values to maintain the proportions. Further, in some examples, when models are rotated, the primary scale axis is recalculated using the same method above and scale is recalculated.

Figure 4D:
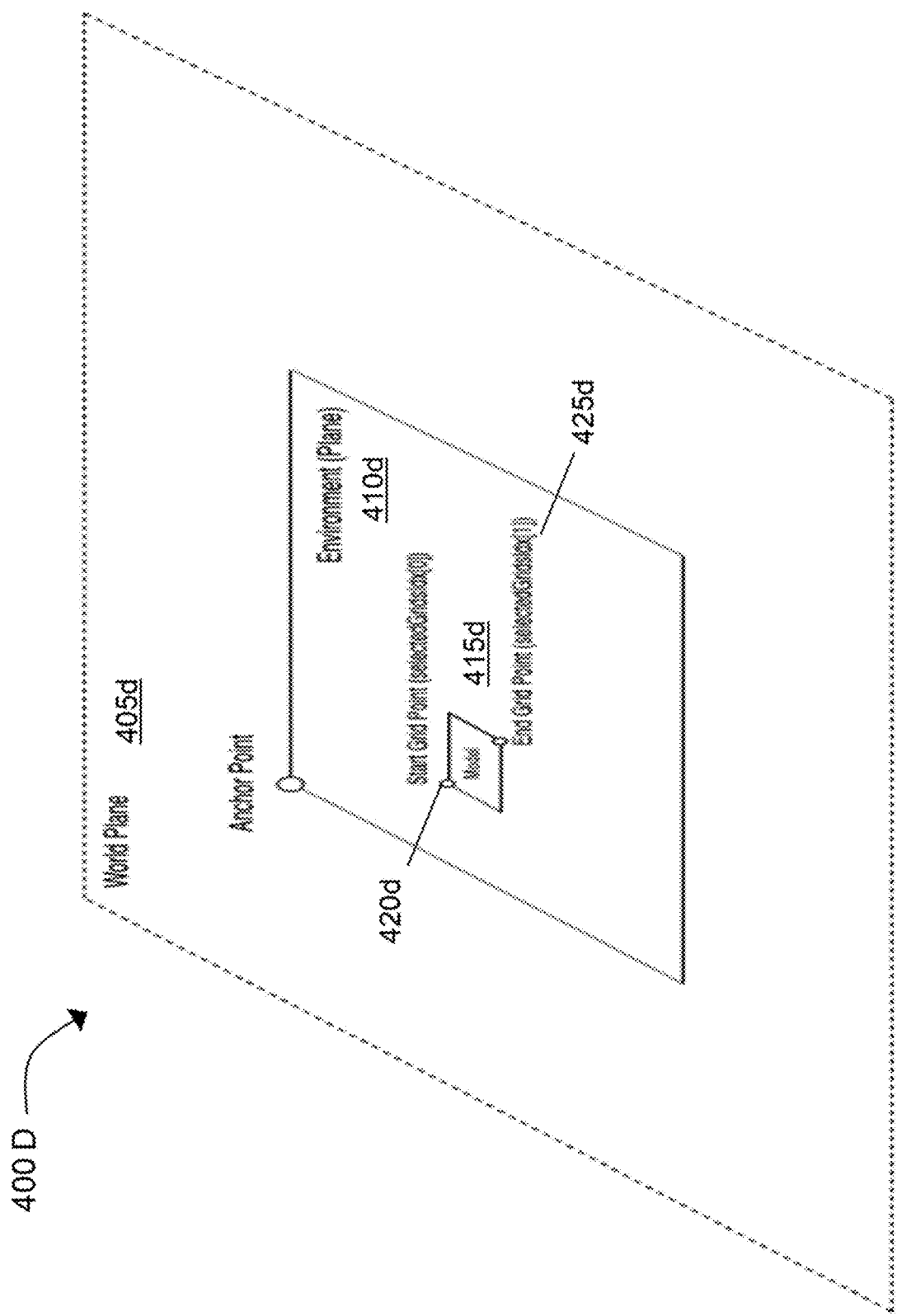

FIG. 4D illustrates the digital layout 400D as a hierarchical layout with world plane 405d, an environment plane 410d and an asset 415d on the planes. FIG. 4D illustrates the start point and end point for the asset.

FIGS. 5A-5J illustrates various examples of asset placement in the digital layout representative of any environment, according to an example embodiment of the present disclosure. While FIGS. 5A-5E illustrates digital layout representing examples of asset placement for any environment, FIGS. 5F-5J illustrates digital layouts corresponding to a floorplan. As may be understood, in accordance with various example embodiments described herein, the digital layout may be representative of, for example, but not limited to, a floor plan, an illustration, and a satellite photo or any other such similar feature.

Figure 5A:
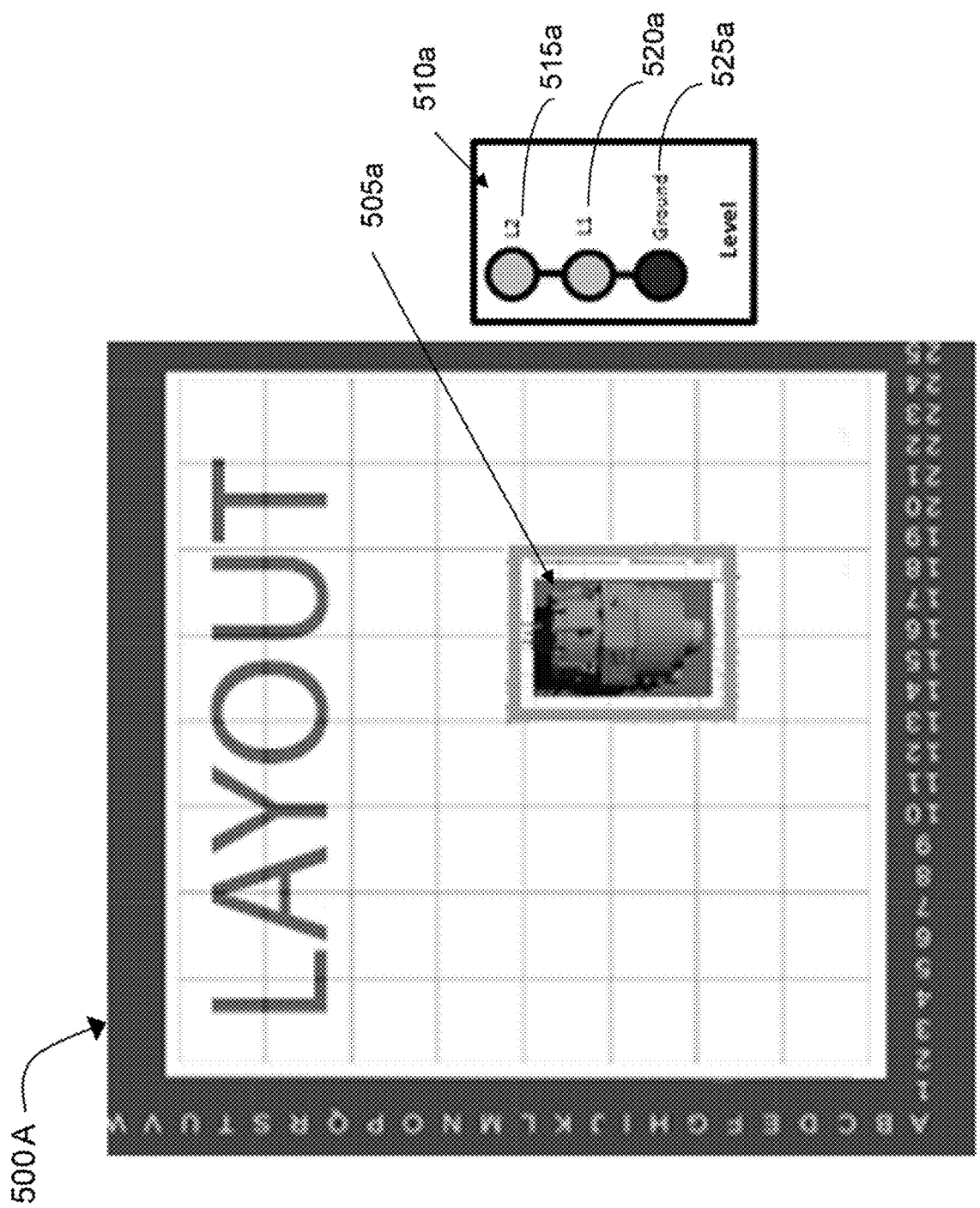
FIGS. 5A-5J illustrates various examples of asset placement in the digital layout, according to various example embodiments of the present disclosure.

FIG. 5A illustrates a vertical view 500A of a layout for an asset 505a generated by the extended reality environment generation system 110, in accordance with an example embodiment. According to some examples, the layout represents an anatomy of the vertical view 500A for an asset upload and localization through a chosen co-ordinate system.

In some example embodiments, a user may be presented with a layout (for example, but not limited to that of a floorplan, a map, a view) on which the user may specify a location at which an asset may reside in the real-world. In this aspect, the user may manipulate the placement of the asset by using anchor points, as described earlier in reference to FIG. 4D, for positioning of each model at respective positions relative to the physical world (i.e., real world environment). The anchor point defines where the environment is positioned relative to the world plane. Further, in some examples, the user may specify, via a user input on the layout, a pin or bounding box based on the size of the asset. For instance, assets of large size may require a bounding box to highlight its scale. This information may be captured as metadata which may be additionally uploaded to a database utilized by the extended reality environment generation system 110. Further, this transformation information later can be used as part of the linking and downloading process for rapid digital twin visualizations by the extended reality environment generation system 110.

In some example embodiments, by use of anchor points that may be derived from a GPS and functional location information, each model can be represented in positions relative to the physical world. Accordingly, in the layout, all models within an environment may be relative to its anchor point and this information may be stored in the environment's metadata.

By way of implementation of various example embodiments described herein, the extended reality environment generation system 110 operates as a decoupled system of defining and creating models independently on how they would be represented in the real world. In other words, models become independent entities until they are imported into the environment, and the environment defines how where the model will be positioned in the world and how big it should be (for instance, its scale). As illustrated, a level descriptor 510a may provide indication of levels with respect to a surface plane in different shades. For instance, L2 and L1 may represent level 1 515a and level 2 520a, and Ground 525a may represent a ground level corresponding to a physical environment.

Figure 5B:
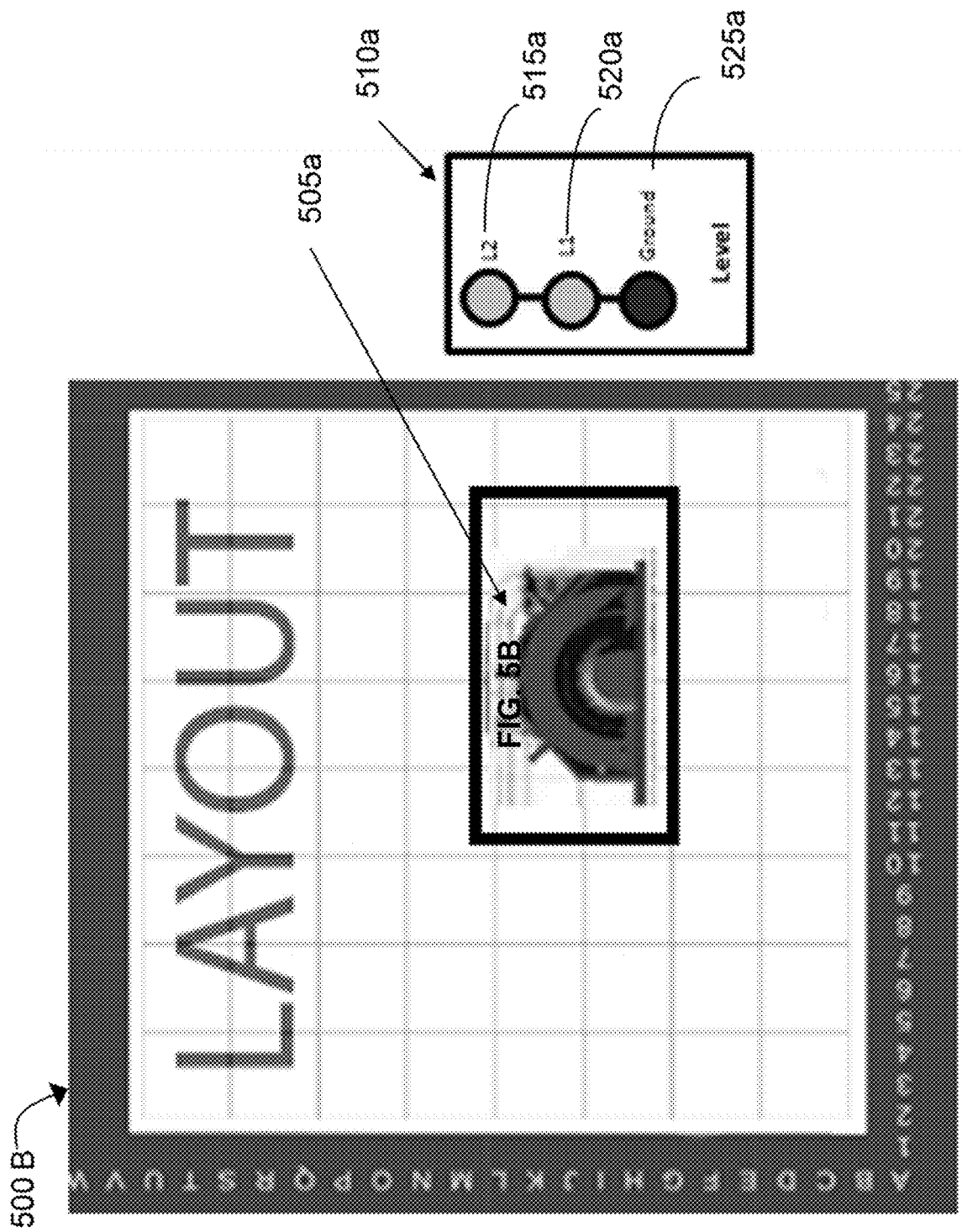

FIG. 5B illustrates a horizontal view 500B of the layout for the asset 505a generated by the extended reality environment generation system 110, in accordance with an example embodiment. In some examples, similar to the vertical view 500A as illustrated in FIG. 5A, the user may be presented with a layout form the x-axis on which the user can specify the location at which the asset will reside in the real world based on the displayed graphic. An example of horizontal view of a layout associated with a floorplan is illustrated in FIG. 5G According to some example embodiments, using the horizontal view 500B, the user may also along the vertical axis (Z) a distance from the ground plane for the assets, thereby, enabling accurate placement in future exports of the assets. In some examples, the layout may also enable the user to provide an approximate value of position along Z axis, as desired.

Figure 5C:
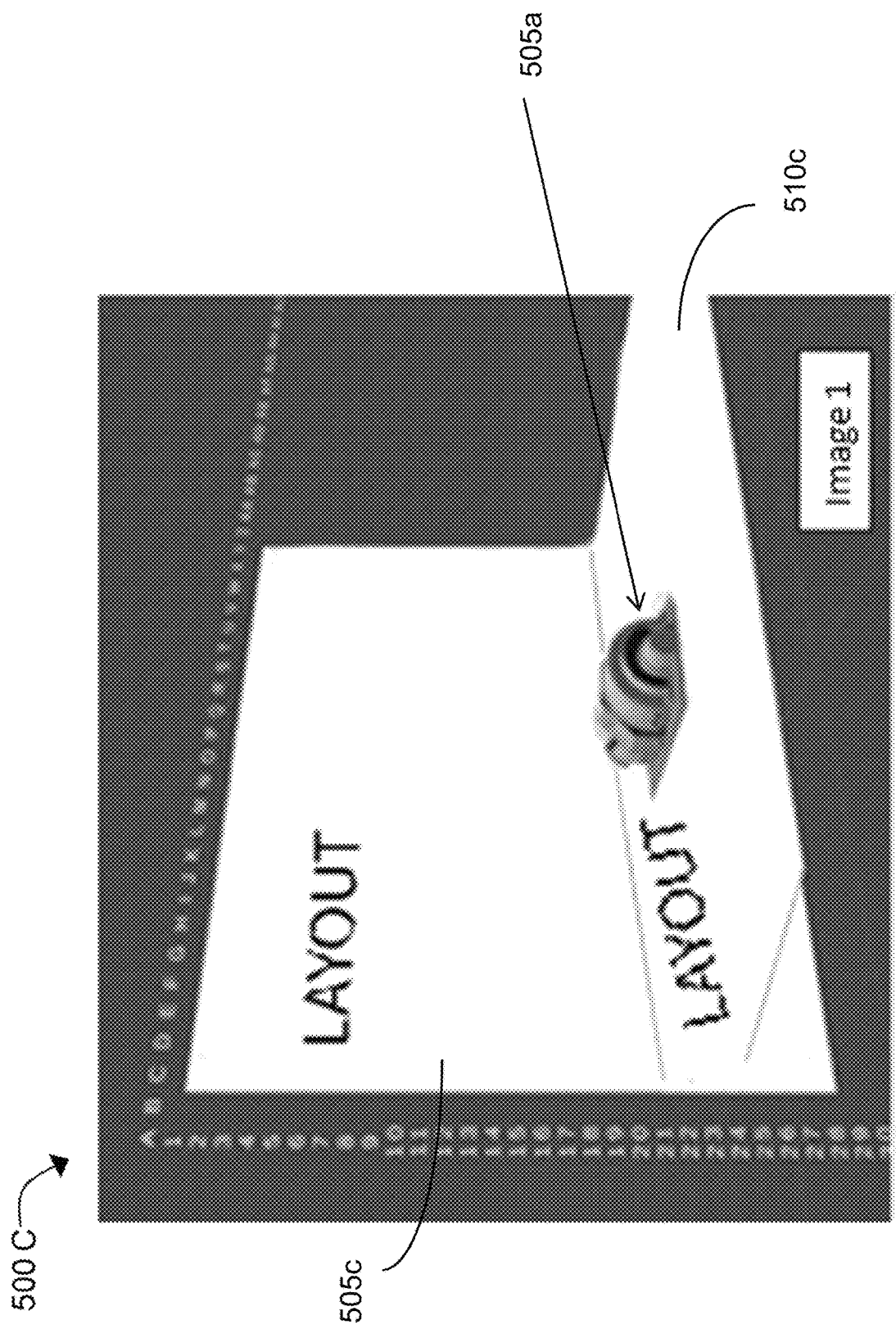
Figure 5D:
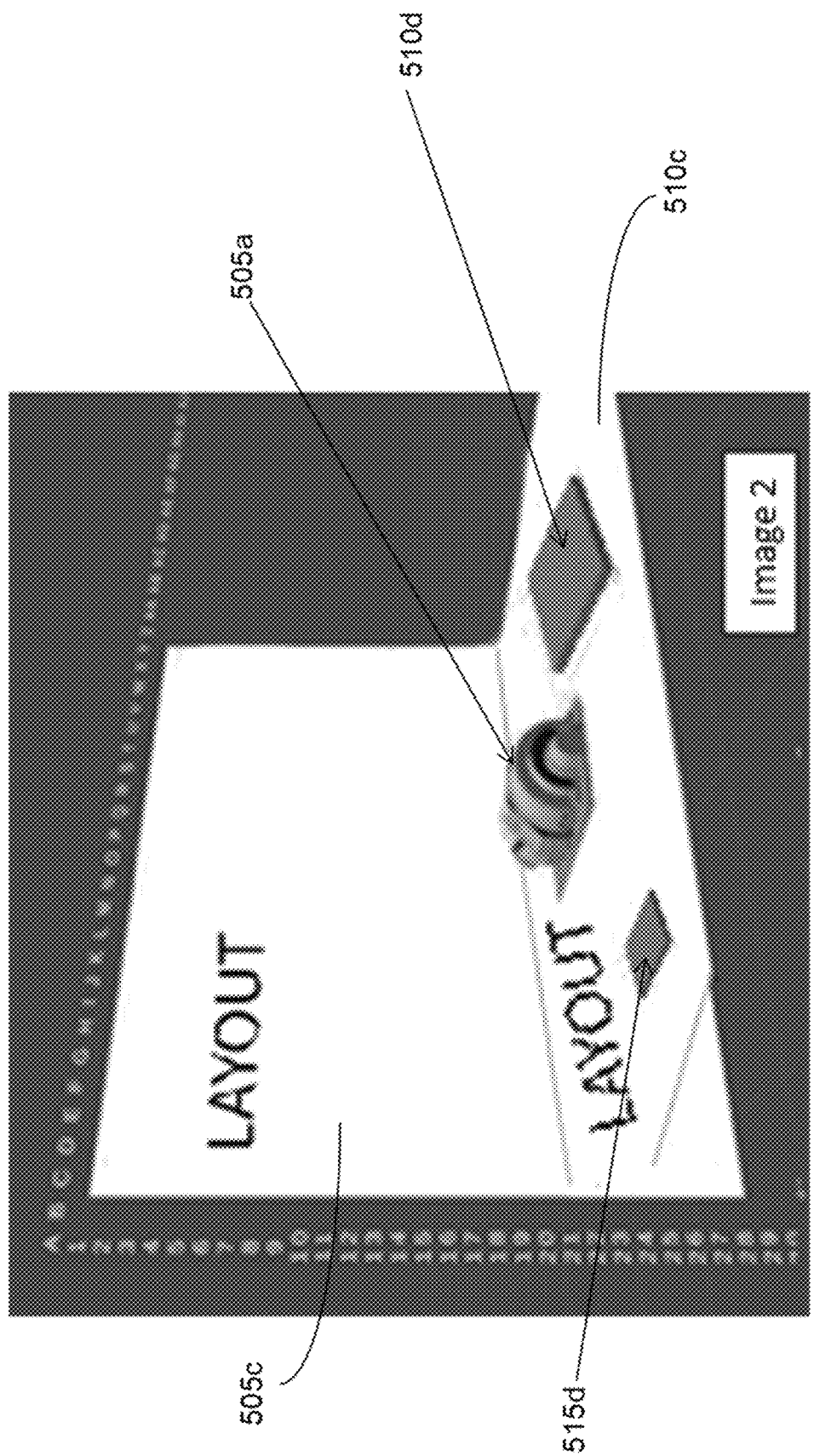

FIG. 5C illustrates a digital layout with a first perspective view 500C of the asset 505a with respect to a vertical plane 505c and a horizontal plane 510c. The digital layout illustrated in FIG. 5C can be generated by the extended reality environment generation system 110, in accordance with an example embodiment. FIG. 5D illustrates a digital layout with a second perspective view 500D of multiple uploaded assets (505a, 510d, 515d) in relation to each other, in accordance with some example embodiments.

Figure 5E:
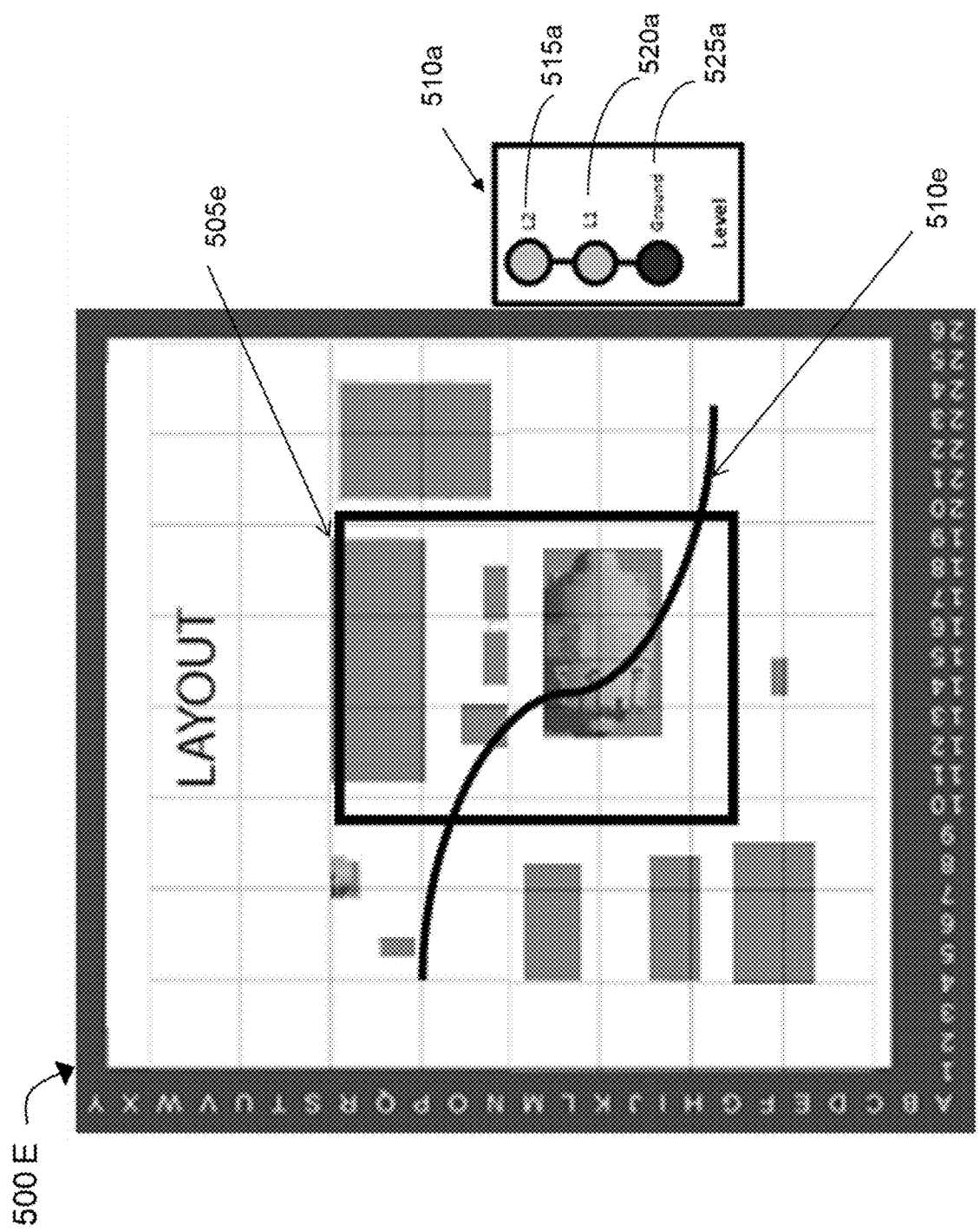

FIG. 5E illustrates a view 500E of a digital layout with multiple uploaded assets positioned in relation to each other, a path marker 510e, and a bounding box marker 505e, in accordance with some example embodiments. The layout represented in FIG. 5E enables high speed model selection that may support fast turnaround of virtual environments. By using the layout multiple assets may be linked by a user based on providing simple user inputs. In some example embodiments, using the layout, the user may select individual assets, groups of assets or assets that may be along a given path for analysis, modification and/or export. In some example embodiments, the view 500E may provide to the user a birds-eye-view of models/assets etc. that may pertain to specific regions within the chosen environment type (for example, a floorplan/image/grid environment etc.). In some example embodiments, the user may also utilize the layout to group assets dynamically based on one or more smart asset linking techniques (for example, based on nearest neighbor linking according to floorplan pins/bounding box selections etc.)

In some example embodiments, a scene associated to the layout may be exported by bundling set of objects of the environment together into a "bundle". In some examples, these bundles may include all the model assets that may be referenced from the path and all associated metadata to tie it back into world space-coordinates.

In some examples, the path marker 510e may enable model linking through nearest neighbor based on selection of assets displayed on the layout. Further, the bounding box marker 505e may be utilized for selecting a cell region for selection of assets and/or associated models within an area.

FIGS. 5F-5J illustrates coordinates based placement of assets in the digital layout related to a floorplan. The digital layouts illustrated in FIGS. 5F-5J are similar to ones as illustrated and described earlier in FIGS. 5A-5E, however, are related to a floorplan.

In accordance with various example embodiments described herein, for linking information from real world to digital world the extended reality environment generation system 110 may utilize a co-ordinate system specification. In some examples, the co-ordinate system specification may be focused on 2 key elements-(a) data transformation (for example, transformation of data in terms of size, position in x,y,z co-ordinates, rotation of an object etc.) and (b) unit translation (for example, translation of 1 unit=1 meter). In some examples, the co-ordinate system specification may be based on functional locations of assets with respect to an organization and/or industry.

In some example embodiments, based on the co-ordinate system specification, a multi-grid matrix may be setup and aligned to replica of floor plan in the digital layout and assets may be placed on the floor plan, such that their location may be recorded, via the multi-grid matrix. As elaborated above, real world or physical environment co-ordinates may be represented by GPS or Functional locations. In some examples, the GPS values may be broken down into both latitude [for example, −37.796944] and longitude [for example, 144.972632], which may be derived from various location finding sources including a mapping software.

In some examples, functional locations of assets may require knowledge from specific physical environments and a functional location breakdown specification. In some example embodiments, emphasis may be given to higher hierarchy functional location metric data and this information may be overlaid over the grid to cater for smart asset linking.

Figure 5F:
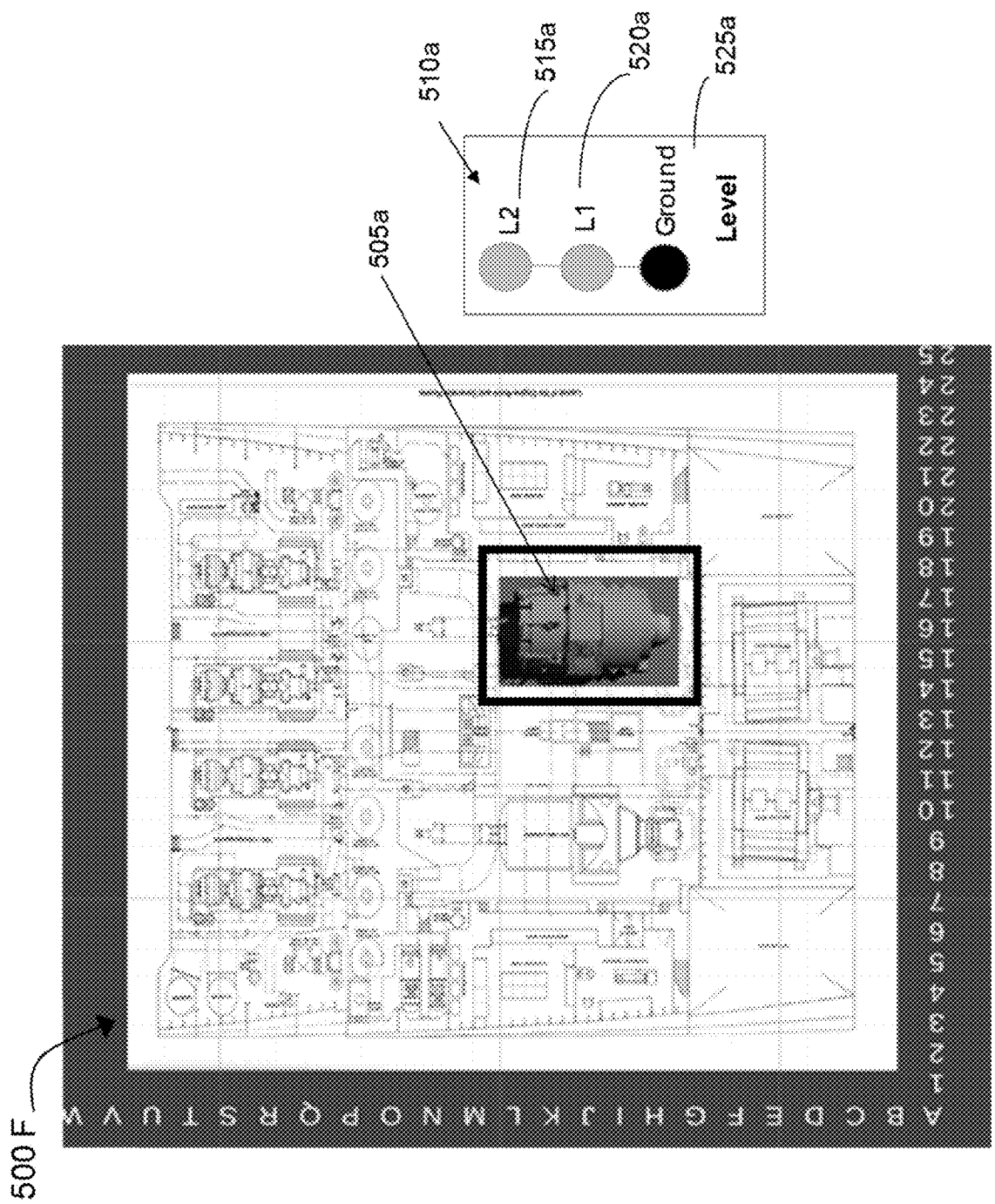
Figure 5G:
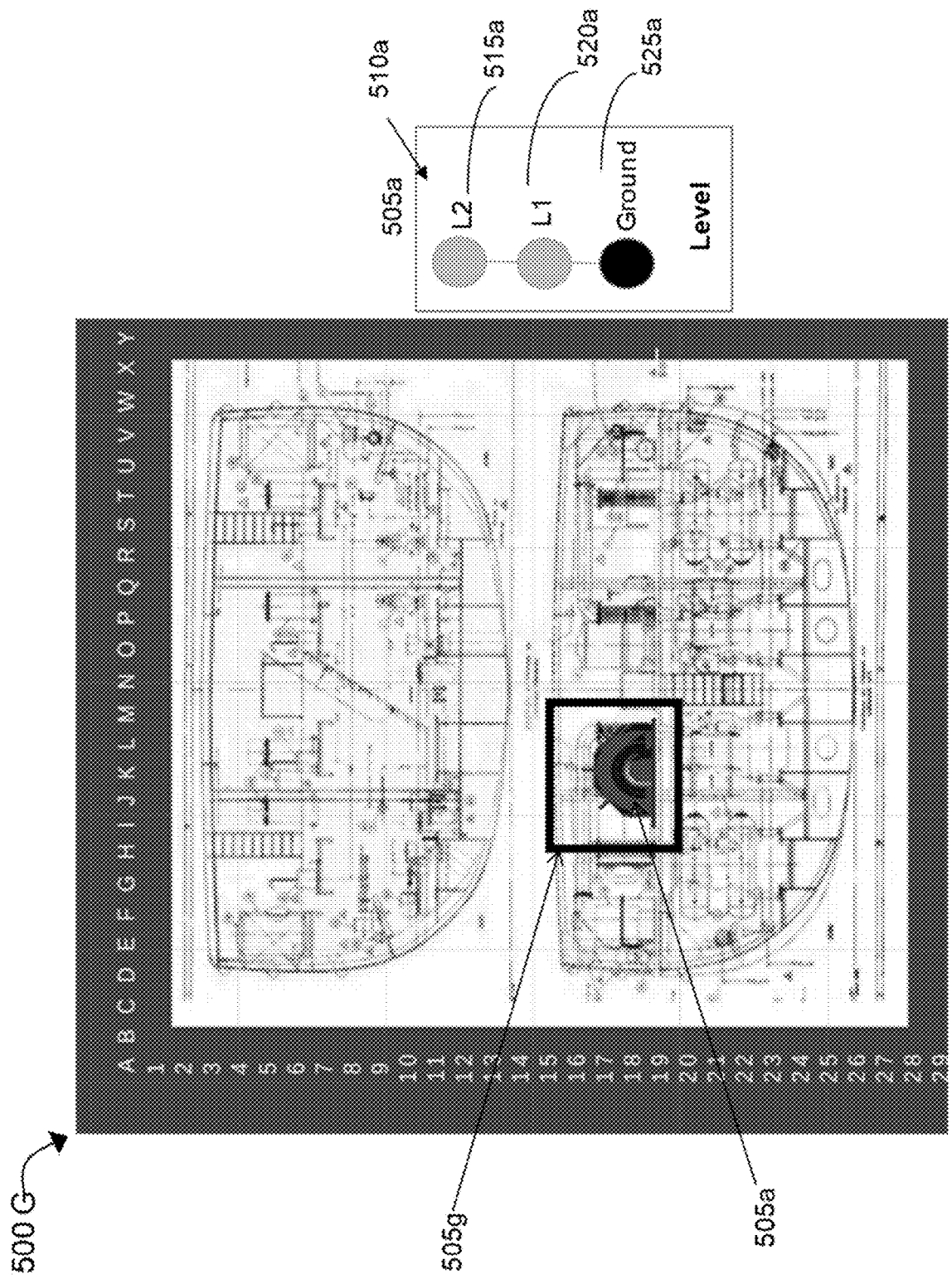

Similar to as described in reference to FIG. 5A, FIG. 5F illustrates a view 500F illustrating a vertical placement of the asset 505a in the digital layout corresponding to a floorplan. As illustrated, a user may be presented with the uploaded floor plan/map/view on which they can specify the location in which it will reside in the real world based on this graphic. The user can either specify a pin or bounding box based on the size of the asset. Larger assets will require a bounding box to highlight their scale, which will be captured as metadata of the asset. This transform information later can be used as part of the linking and download process for rapid extended reality environment visualizations. Further, as illustrated in FIG. 4D anchor points may be defined for each environment, which are derived from GPS and functional location information. Further, each model can be represented in positions relative to the physical world. All the models within an environment are relative it's anchor point and stored in the environment's metadata. The anchor point defines where the environment is positioned on relative to the world. This technique can create a decoupled system of defining and creating models independently on how they would be represented in the real world. Models become independent entities until they are imported into the environment, and the environment defines how where the model will be positioned in the world and how big it should be (it's scale)

FIG. 5G illustrates a view 500G depicting a horizontal placement of the asset 505a along with a bounding box 505g in the digital layout pertaining to a floorplan. Similar to the vertical layouts, as described in reference to FIGS. 5A and 5F the user may be presented with the uploaded floor plan/map/cross section form the x-axis on which they can specify the location in which it will reside in the real world based on this graphic. In some examples, the user can either specify a pin or bounding box based on the size of the asset. As stated earlier, larger assets may require a bounding box to highlight their scale, which will be captured as metadata of the asset. Further, this transform information later can be used as part of the linking and download process for rapid extended reality environment visualizations.

Further, in this view 500G the user also may specify along the Vertical Axis (Z) the distance from the ground plane it resides allowing for accurate placement in future exports of the assets.

Figure 5H:
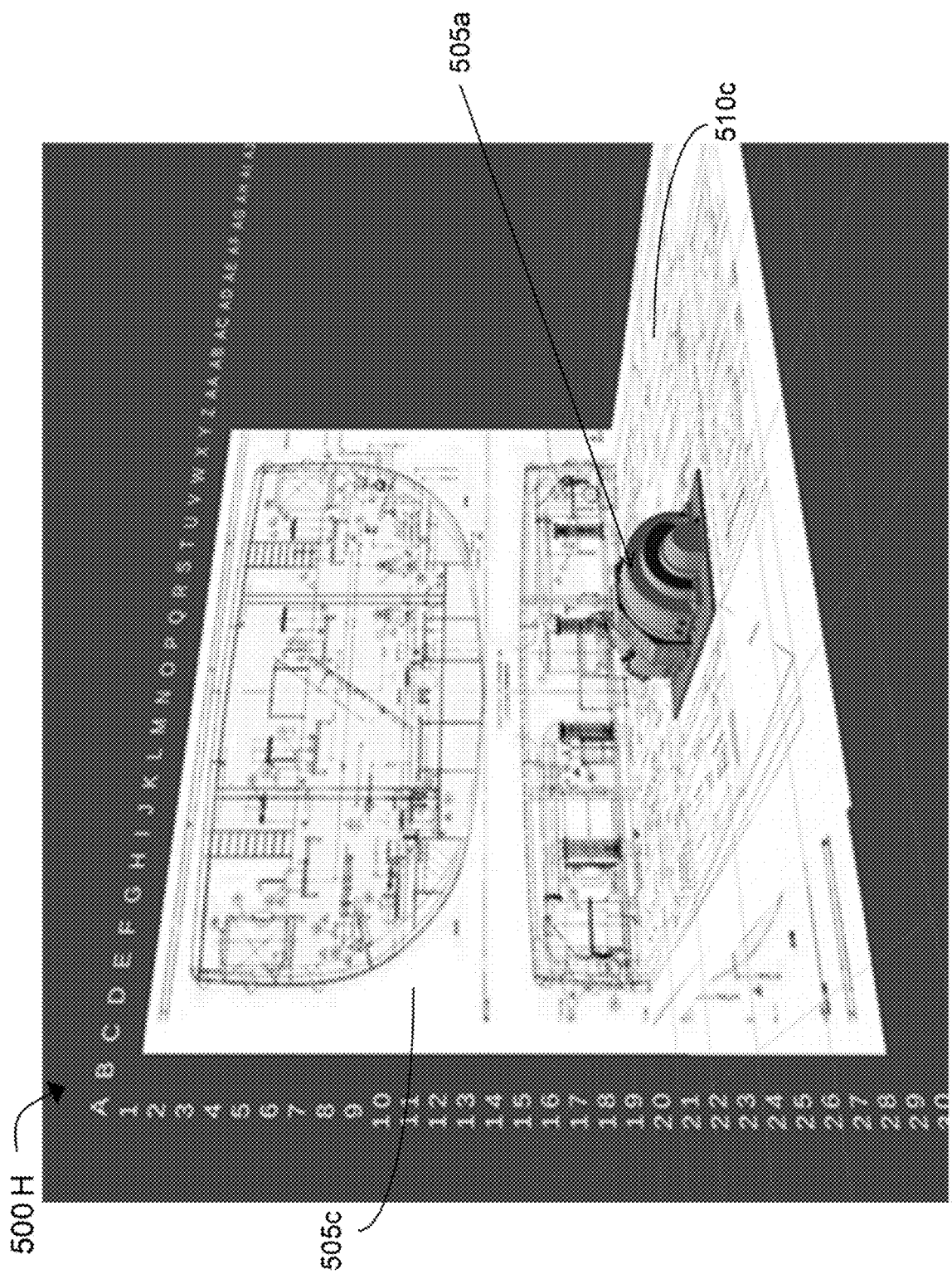
Figure 5I:
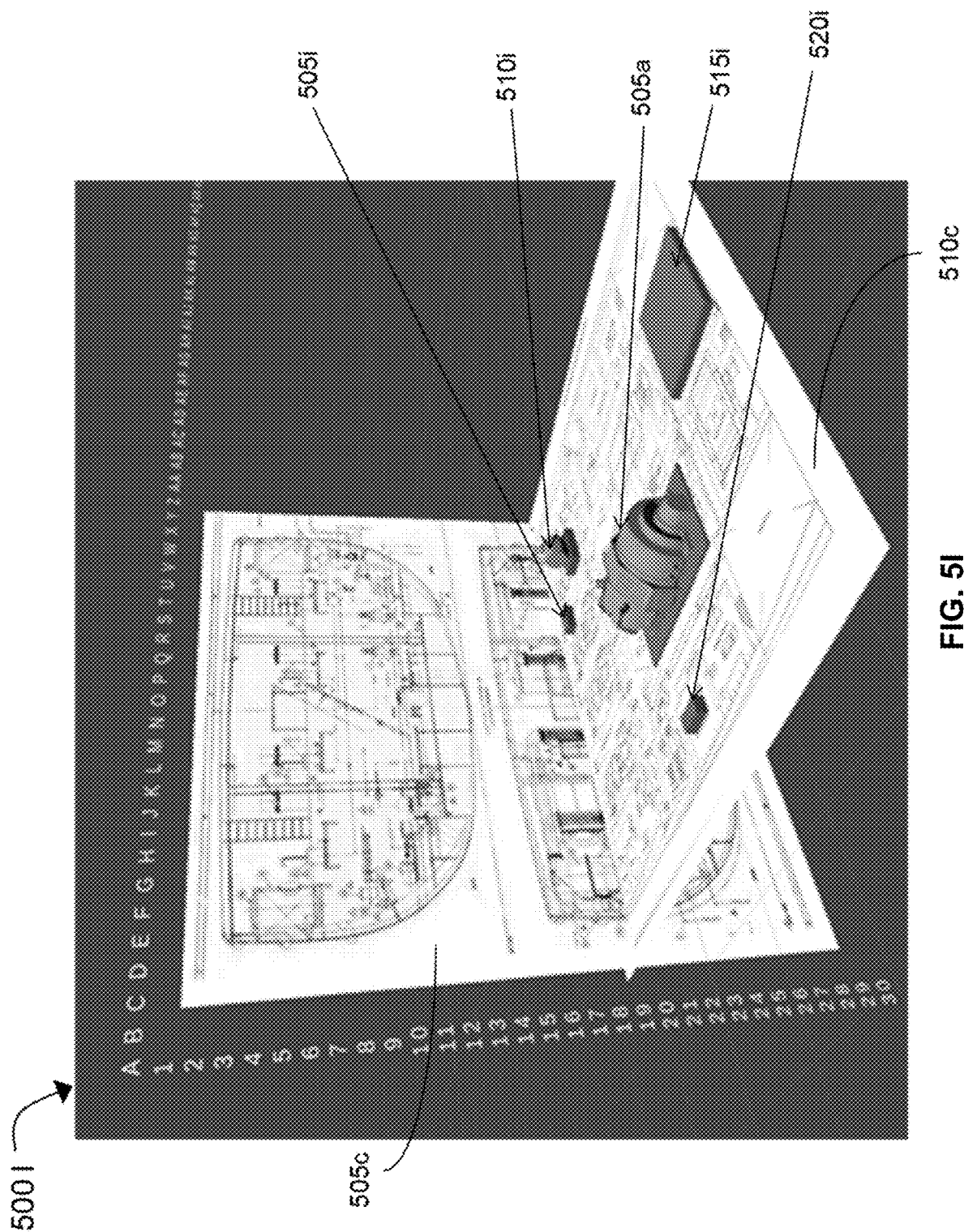

FIGS. 5H and 5I illustrates perspective placement of the asset in the digital layout corresponding to the floorplan. According to some examples, once the asset is positioned along the x y and z axis there will be the ability to visualize the asset based on the various floor plan data. In some examples, where more assets are present the user can see high-level boxes/graphics of these surrounding assets highlighting the room that is being generated.

FIG. 5H illustrates the perspective view 500H of a single asset in relation to the vertical and horizontal floor plan layouts. Further, FIG. 5I illustrates the perspective view of multiple uploaded assets (505i-520i) overlaid over the horizontal plane 501c corresponding to the floor plan of the digitized model. In some example embodiments, each asset linking that may be completed can create a "Rosetta Stone" like capability that may enable nearest neighbor association for asset export, providing assets from a single source of truth.

Figure 5J:
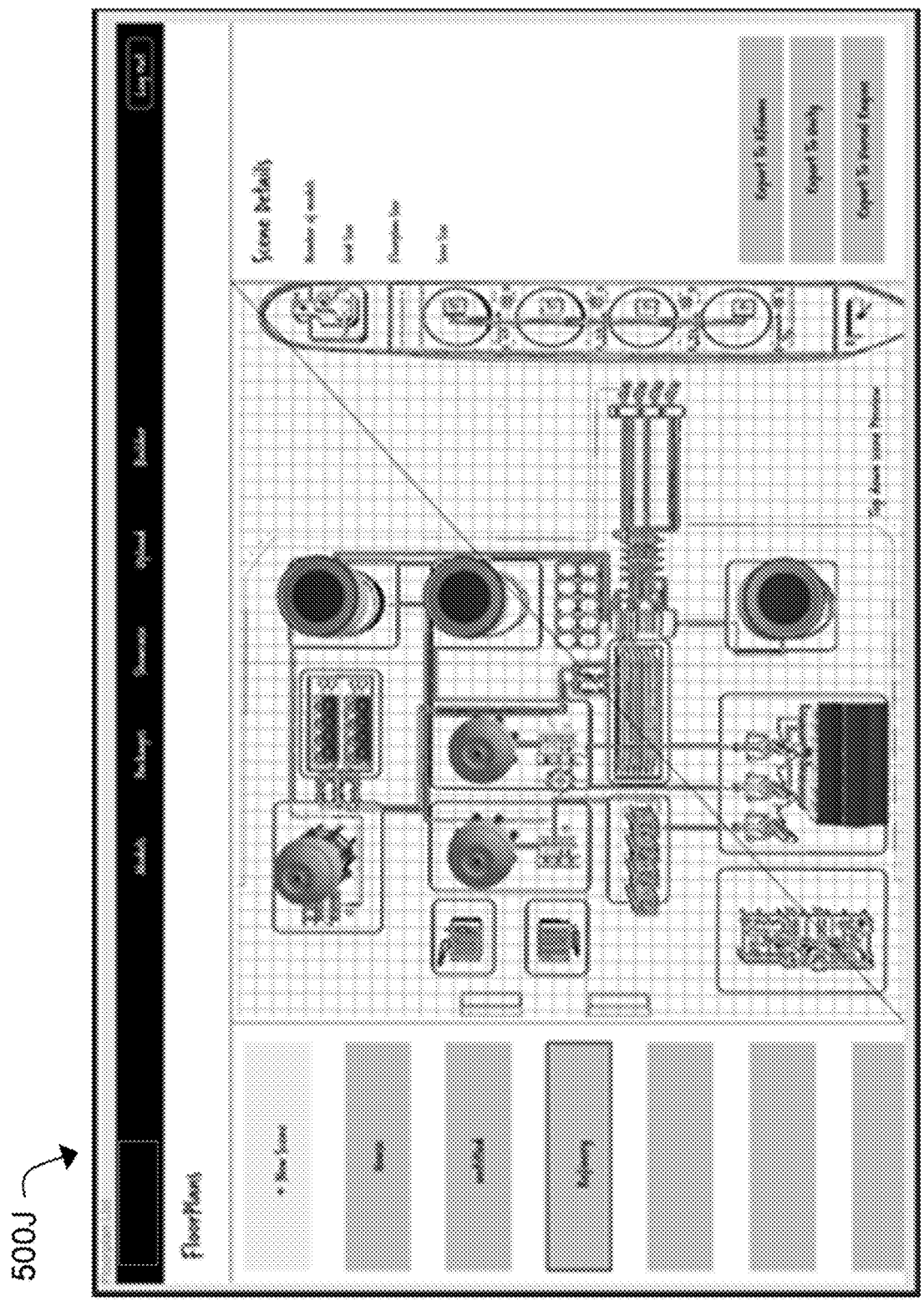

FIG. 5J illustrates a screen 500J showing a layout (for instance, a user interface) which may be utilized by the users to create and view various digital representation of environments. The layout 500J may also enable the users to export into different programs to consume the generated scene.

FIGS. 6A-6B illustrates data structure of components of the extended reality environment generation system according to an example embodiment of the present disclosure. Specifically, FIG. 6A illustrates data structure of metadata of the digital layout according to an example of the present subject matter. In an example embodiment, the metadata may include a field name 605a, a type 610a indicative of a data type of the field name 605a, and a description 615a associated with the field name 605a. For instance, for a field 'id' the type is 'string' and the description indicates that it is a unique identifier for a floorplan. Accordingly, in various examples, the metadata of the asset may include unique, for example, but not limited to, identification number for the digital layout, version number, horizontal view, position with respect to global space, dimension of one unit in the scaled-down matrix, dimension of the complete scaled-down matrix, details of all models associated the digital layout for the physical environment, GPS and function coordinates of the asset in the models and definition of placement of the digital layout in the global space.

FIG. 6B illustrates data structure of metadata of the model in accordance with an example of the present subject matter. In an example embodiment, the metadata may include a field name 605b, a type 610b indicative of a data type of the field name 605b, and a description 615b associated with the field name 605a. For instance, for a field 'model' the type is 'Model.v' and the description indicates that the model includes a version number and represents an asset with its linkage (for example, relationship with data elements) it is a unique identifier for a floorplan. Accordingly, in various examples, as illustrated, the metadata of the model may include unique identification number for the model, version number, details of the asset, area coordinates for the model, Euler XYZ rotation of the model, scalar value for scaling the model to a bounding box, level of the model with respect to ground level in the physical space, and offset distance of the model from the ground level.

It may be understood that metadata for the digital layout may be created for each floor plan/map that the users adds. Accordingly, each metadata representation for the digital layout of each floor plan may store information about models that may be linked to the floor plan (under the scene Models object type) and may include its transforms (rotation, scale, translation) relative to the environment. The scale of the model may be derived from the grids in which it occupies (selectedGridsIdx field in Scene Models).

Figure 7A:
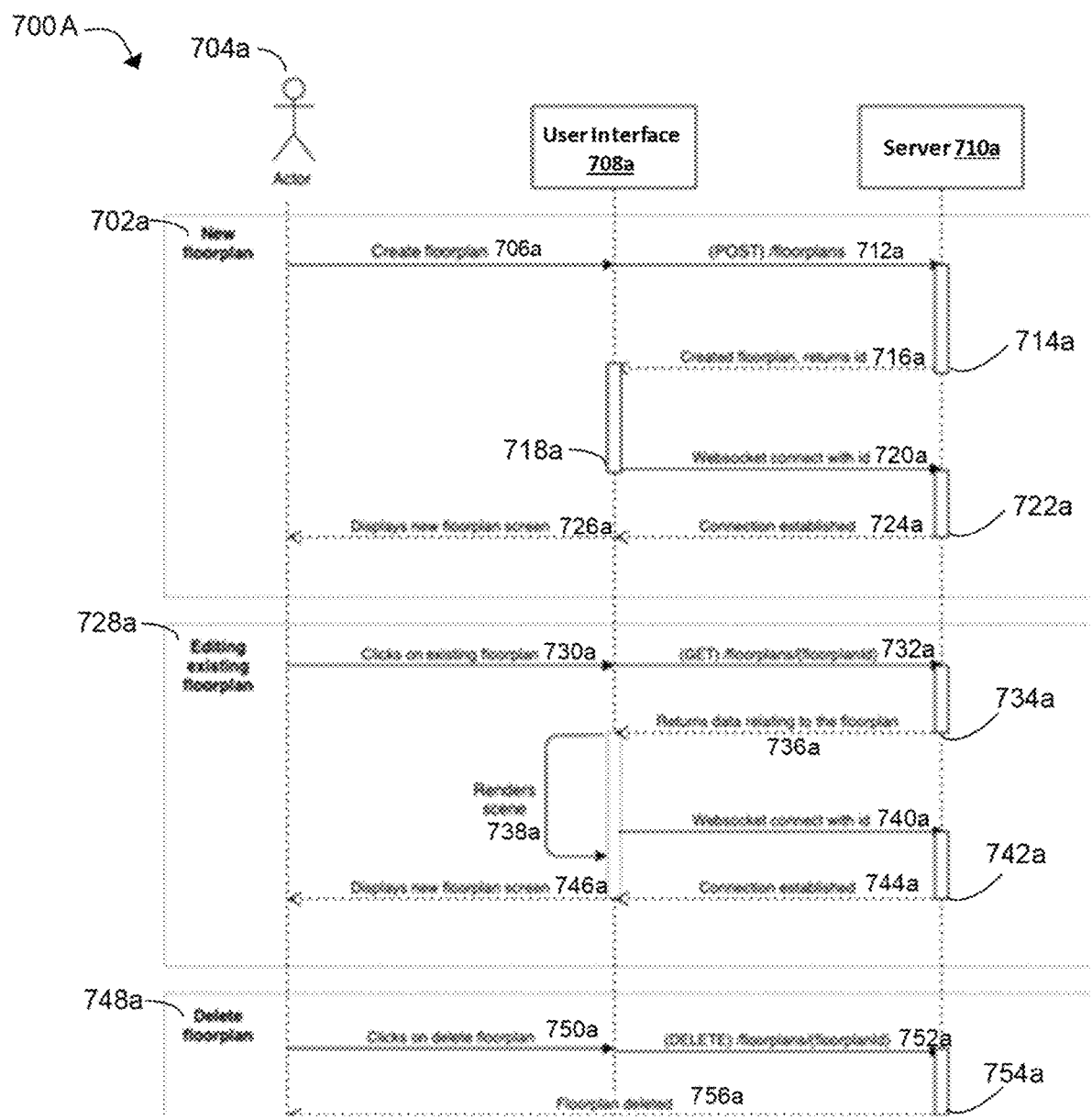
FIGS. 7A-7B illustrates examples of message flow diagrams corresponding to an operation of the extended reality environment generation system, according to an example embodiment of the present disclosure.
Figure 7B:
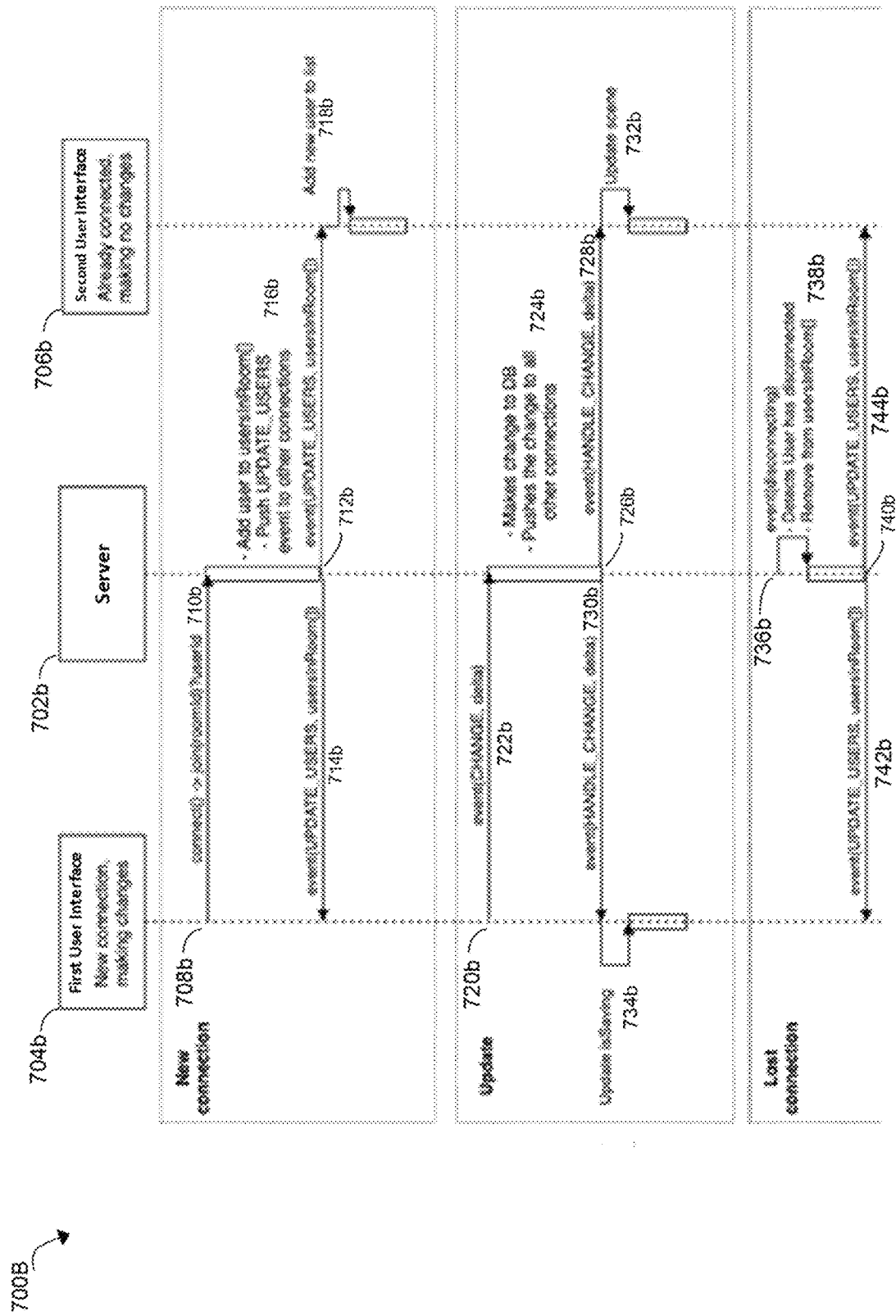

FIGS. 7A-7B illustrates examples of message flow diagrams 700A and 700B corresponding to one or more operations with respect to the extended reality environment generation system 110, according to some example embodiments of the present disclosure. Referring to FIG. 7A, the message flow diagram 700A illustrates an example operation of modification of digital layout and/or a model by the extended reality environment generation system 110, in accordance with an example embodiment. As illustrated at step 702a, a user 704a may provide a user input (for example, a create floor plan-request 706a) on a user interface 708a for creation for a new floor plan. In some examples, the user interface 708a referred herein may correspond to the user interface of the web application 305, as described earlier in reference to FIGS. 3A and 3B. In some examples, the user interface 708a may also represent a client end for interacting with a server 710a. In response to the user input, the server 710a may receive a post request 712a for creation of floor plans. Further, in response to receiving the post request 712a, at step 714a, the server 710a may provide to the user interface 708a a created floorplan 716a along with an identifier that may be associated with the response and/or the created floorplan 716a.

As illustrated at step 718a, a WebSocket connection request 720a may be sent from the user interface 708a (for example, a web browser, a web application, or a client end) of the extended reality environment generation system 110 to the server 710a. The WebSocket connection request 720a may be associated with an identifier. As may be understood, the WebSocket connection request 720a may correspond to a socket connection that may enable a persistent connection between the user interface 708a and the server 710a for transacting data between each other. Further, as illustrated at step 722a, the server 710a may send an acknowledgement 724a of the WebSocket connection back to the user interface 708a. Upon receiving the acknowledgement, the user interface 708a may display the new floorplan 726a created by the server 710a based on the user inputs.

In some example embodiments, the user 704a may edit existing floorplan. The user interface 706a may be utilized by the user 704a for editing an existing floorplan. Illustratively, at step 728a, the user 704a may provide a user input for editing an existing floorplan. For instance, in an example, the user 704a may click on an existing floorplan 730a that may be displayed on the user interface 708a (for example, of the web application). In response to receiving the user inputs indicative of editing of an existing floorplan, a GET request 732a for obtaining a floorplan corresponding to a floor plan identifier may be provided by the user interface 708a to the server 710a. Further, upon receiving the GET request 732a, as illustrated at step 734a, the server 710a may return data 736a pertaining to the floorplan related to the user's request. Accordingly, upon receiving the data, a scene pertaining to the floorplan may be rendered 738a on a display interface by the user interface 708a. Accordingly, a WebSocket connection exchange, as described earlier in reference to creation of new floorplan can be established between the user interface 708a and the server 710a. For instance, as illustrated, the user interface 708a may send a WebSocket connection request 740a along with an identifier. Further, upon receiving the WebSocket connection request, at step 742a, the server 710a may send an acknowledgement 744a to the user interface 708a. Furthermore, as illustrated, the user interface 708a may display a new floorplan screen 746a to the user 704a.

FIG. 7A also illustrates an operation of deleting an existing floorplan. In some example embodiments, as illustrated at step 748a, the user 704a may provide a user input on the user interface 708a for deletion of a floorplan. In an example, the user 704a may click on delete floorplan 750a option that may be displayed by the user interface 708a. In response to receiving such a user input, a DELETE request with a floorplan identifier associated with the floorplan selected for deletion by the user 704a may be sent to the server 710a. Further, in response to receiving the DELETE request, the server 710a may delete the floorplan from the records. Furthermore, at step 754a, the server 710a may send a notification 756a indicative of deletion of the floorplan to the user 704a. In some examples, the notification of deletion of the floorplan may be displayed to the user 704a.

The embodiment described with reference to FIG. 7A, in some examples, may represent creating, editing and deleting of an environment/floorplan by the user. In some examples, a set of APIs/services running at a backend (for example, the backend services 325) of the extended reality environment generation system 110 may be utilized for performing the creation, editing, and deletion of the floorplan. In some examples, a new environment metadata object may be created by the backend services to perform the activities described in reference to FIG. 7A. According to some example embodiments, there may be not preexisting models that may be available to the server 710a that may be related to a newly created environment/floorplan. Further, in some examples, editing an existing floorplan by the user 704a may not affect any existing models that may have been added to the floorplan. In other words, as a relationship existing between the floorplan and a real world gets decoupled from the floorplan and the models, editing the floorplan may not affect the other. Furthermore, in some example embodiments, deleting an environment and/or the floorplan may also delete all models that may have been associated with that environment and/or the floorplan.

FIG. 7B illustrates a message flow diagram 700B corresponding to one or more operations that may be performed by multiple users with respect to the extended reality environment generation system 110, according to an example embodiment of the present disclosure. In some example embodiments, the flow diagram 700B can correspond to an operation for linking and unlinking of assets that may include adding and/or removing models from the environments. FIG. 7B also illustrates scenarios such as a new connection, update, and a lost connection with respect to which a server 702b of the extended reality environment system 110 may receive inputs from multiple users via multiple user interfaces. Further, in some examples, for performing the operation illustrated in the flow diagram 700B, Web Sockets may be utilized that may enable editing by multiple users in near real time and/or visualization of such changes in near real time.

As illustrated in FIG. 7B, a server 702b may be in communication with a first user interface 704b and a second user interface 706b. In an example embodiment, the first user interface 704b may be utilized by a first user for establishing a new connection. In other words, the user inputs received at the first user interface 704b may be corresponding to a new connection request from the first user to the server 702b. Further, the second user interface 706b may receive inputs from a second user that may be already connected to the server 702b.

Illustratively, at step 708b, a request 710b for a new connection from the first user interface 704b may be received at the server 702b. The request 710b may be a Web Socket CONNECT request and may include a first identifier associated with the first user. The request 710b may also include a room identifier associated with a first room (for example, environment/floor) that may be of interest to the first user. In response to receiving the request 710b, the server 702b at the step 712b may add the first user to a user in room list that may be maintained by the server 702b for that particular room. Further, as illustrated at step 712b, in response to receiving the request for addition of the first user, the server 702b may send a first event notification 714b to the first user interface and a second event notification 716b to the second user interface 706b. The first event notification 714b and the second event notification 716b may be indicative of an updating of the users in the users in room list by the server 702b. Additionally, the server 702b may also send PUSH requests indicative of the updating in the user list to other connections (for example, other web clients that may be connected to the server 702b). Further, as illustrated, the second user interface 706b may save, perform and/or display a change of addition 718b of a new user (for instance, the first user) to the user list.

FIG. 7B also illustrates an operation of updating of some data (for example, related to the assets and/or the model) while multiple users (for example, client interfaces) may be connected at the server 702b. In some examples, update operation illustrated in FIG. 7B depicts a manner in which the server 702b can associate a model (for example, digital model) to a physical environment when a user makes a change. As may be understood, the user can make a change by providing his/her inputs for the change on a respective user interface such as, the first user interface 704b and/or the second user interface 706b (for example, of the web application 305). In this aspect, in some examples, at a back end, a new Scene Model object corresponding to models of the physical environment may be created and added to an array corresponding to various SceneModels holding the metadata associated with various physical environments. Further, the update operation of the FIG. 7B also depicts a manner in which the server 702 may notify existing users about a change that has been made.

Illustratively, the update operation may start at step 720b. At step 720b the server 702b may receive an update request 722b from the first user interface 704b. In some examples, the update request 722b may be associated to an event and may include data indicative of change and delta with respect to existing information. In some examples, the change and/or the update may be associated with the assets and/or the model. In response to receiving of the request 722b, the server 702b may make required changes 724b to the database storing the model information. These changes may be based on information received in the request 722b. Further, at step 726b, the server 702b may push this change to all other connections existing with the server 702b. The server 702b may send a first event message (for example, a PUSH notification) 730b to the first user interface 704b (for example, a first client interface) that may be used by the first user. Further, the server 702b may send a second event message 728b to the second user interface 706b (for example, a second client interface) that may be used by the second user. These event messages may include information indicative of the change and/or actions that may be performed at respective client ends to handle that change. In response to receiving the event messages, the first user interface 704b and/or the second user interface 706b may perform and/or save the respective changes and/or updates, at its respective ends (illustrated at steps 732b and 734b)

FIG. 7B also illustrates an example of a lost connection operation with respect to the extended reality environment generation system 110. In some examples, the server 702b may identify an event 736b of a disconnection with a user (for example, a third user). In response to detecting that the user has disconnected or an inadvertent disconnection (for example, due to network outage) with the user has occurred, the server 702b may remove that user from the user in room list. Further, as illustrated at step 740b, the server 702b may push event messages (for example, 742b and 744b) notifying the user interfaces connected with the server 702b for this change (for instance, a lost connection or disconnection of the server 702b with the third user). In some examples, these changes may also be reflected at the user interfaces connected with the server 702b in real time.

Figure 8:
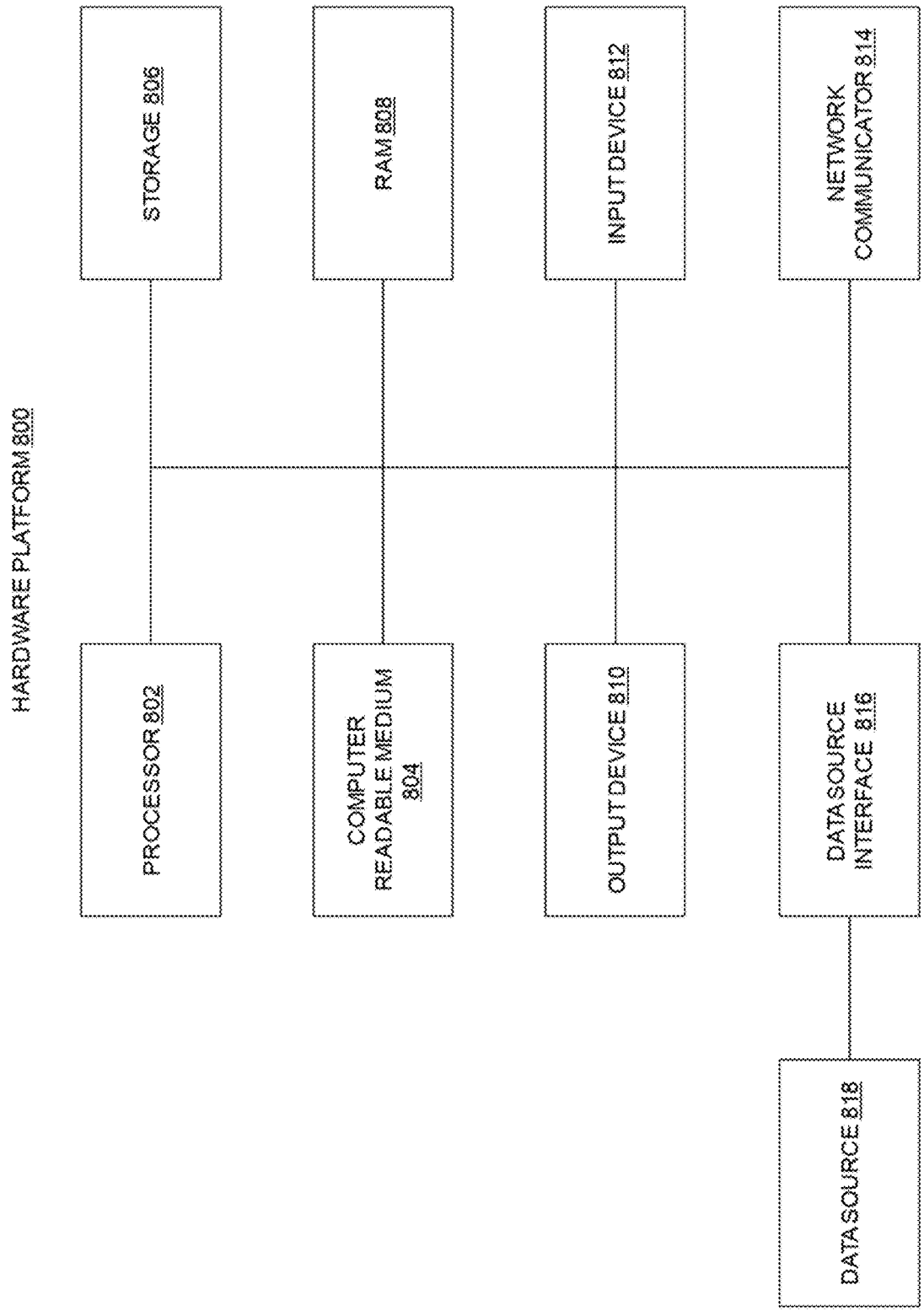
FIG. 8 illustrates a hardware platform for the implementation of an extended reality environment generation system, according to an example embodiment of the present disclosure.

FIG. 8 illustrates a hardware platform 800 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 800. The hardware platform 800 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 8, the hardware platform 800 may be a computer system 800 that may be used with the examples described herein. The computer system 800 may represent a computational platform that includes components that may be in a server or another computer system. The computer system 800 may execute, by a processor (for example, a single or multiple processors) or other hardware processing circuit, the methods, functions and other processes described herein. These methods, functions and other processes may be embodied as machine-readable instructions stored on a computer-readable medium, which may be non-transitory, such as hardware storage devices (for example, RAM (random access memory), ROM (read-only memory), EPROM (erasable, programmable ROM), EEPROM (electrically erasable, programmable ROM), hard drives, and flash memory). The computer system 800 may include a processor 802 that executes software instructions or code stored on a non-transitory computer-readable storage medium 804 to perform methods of the present disclosure. The software code includes, for example, instructions to gather data and documents and analyze documents. In an example, the content receiver 130, the content pre-processor 140, and the asset linker 150 may the software codes.

The instructions on the computer-readable storage medium 804 are read and stored the instructions in storage 806 or in random access memory (RAM) 808. The storage 806 provides a large space for keeping static data where at least some instructions could be stored for later execution. The stored instructions may be further compiled to generate other representations of the instructions and dynamically stored in the RAM 808. The processor 802 reads instructions from the RAM 808 and performs actions as instructed.

The computer system 800 further includes an output device 810 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 800 further includes input device 812 to provide a user or another device with mechanisms for entering data and/or otherwise interact with the computer system 800. The input device may include, for example, a keyboard, a keypad, a mouse, or a touch screen. Each of these output devices 810 and input devices 812 could be joined by one or more additional peripherals. In an example, the output device 810 may be used to display the results.

A network communicator 814 may be provided to connect the computer system 800 to a network and in turn to other devices connected to the network including other clients, servers, data stores, and interfaces, for instance. A network communicator 814 may include, for example, a network adapter such as a LAN adapter or a wireless adapter. The computer system 800 includes a data source interface 816 to access data source 818. A data source is an information resource. As an example, a database of exceptions and rules may be a data source. Moreover, knowledge repositories and curated data may be other examples of data sources.

Figure 9A:
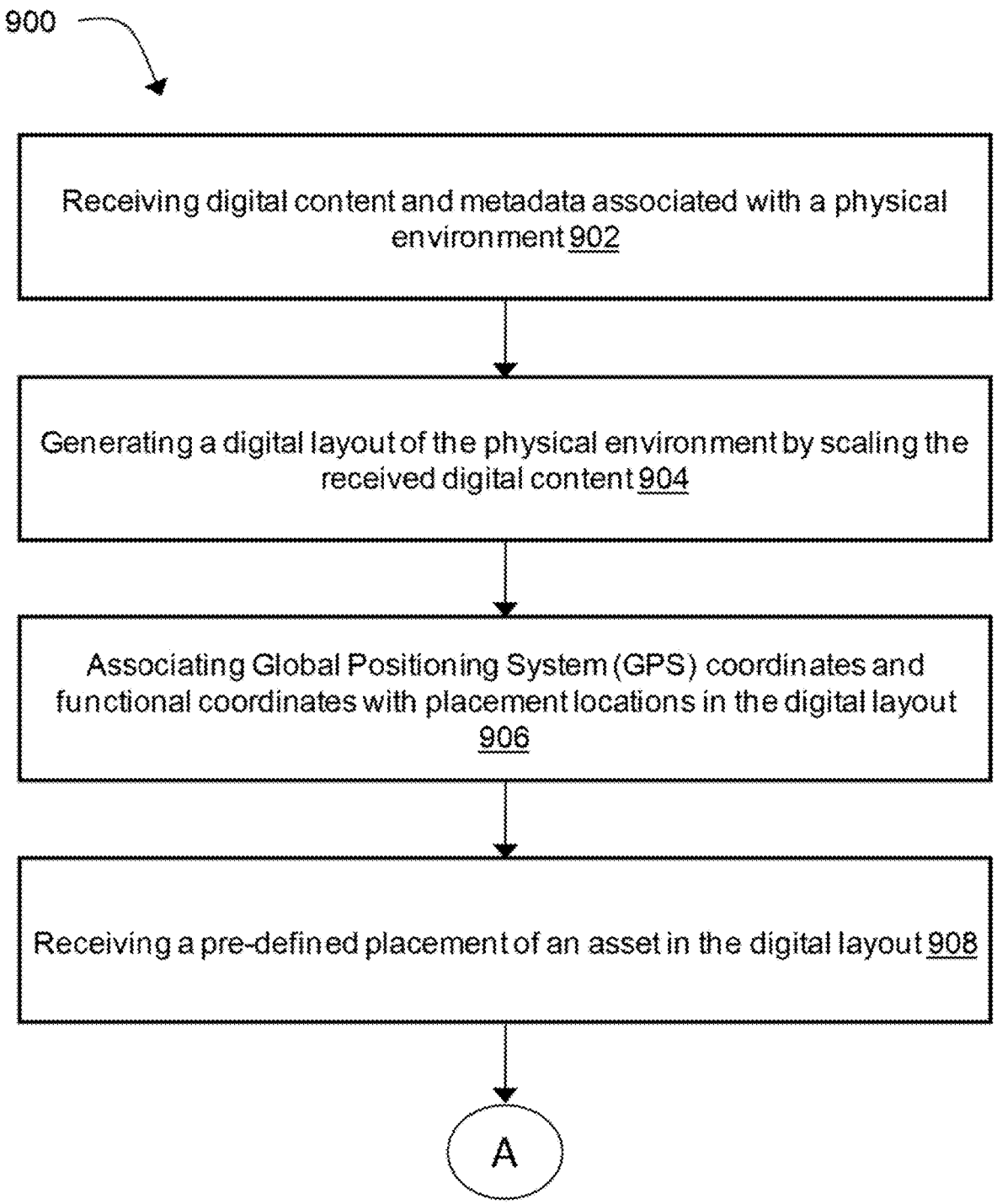
FIGS. 9A and 9B illustrate a process flowchart for extended reality environment generation using an extended reality environment generation system, according to an example embodiment of the present disclosure.
Figure 9:
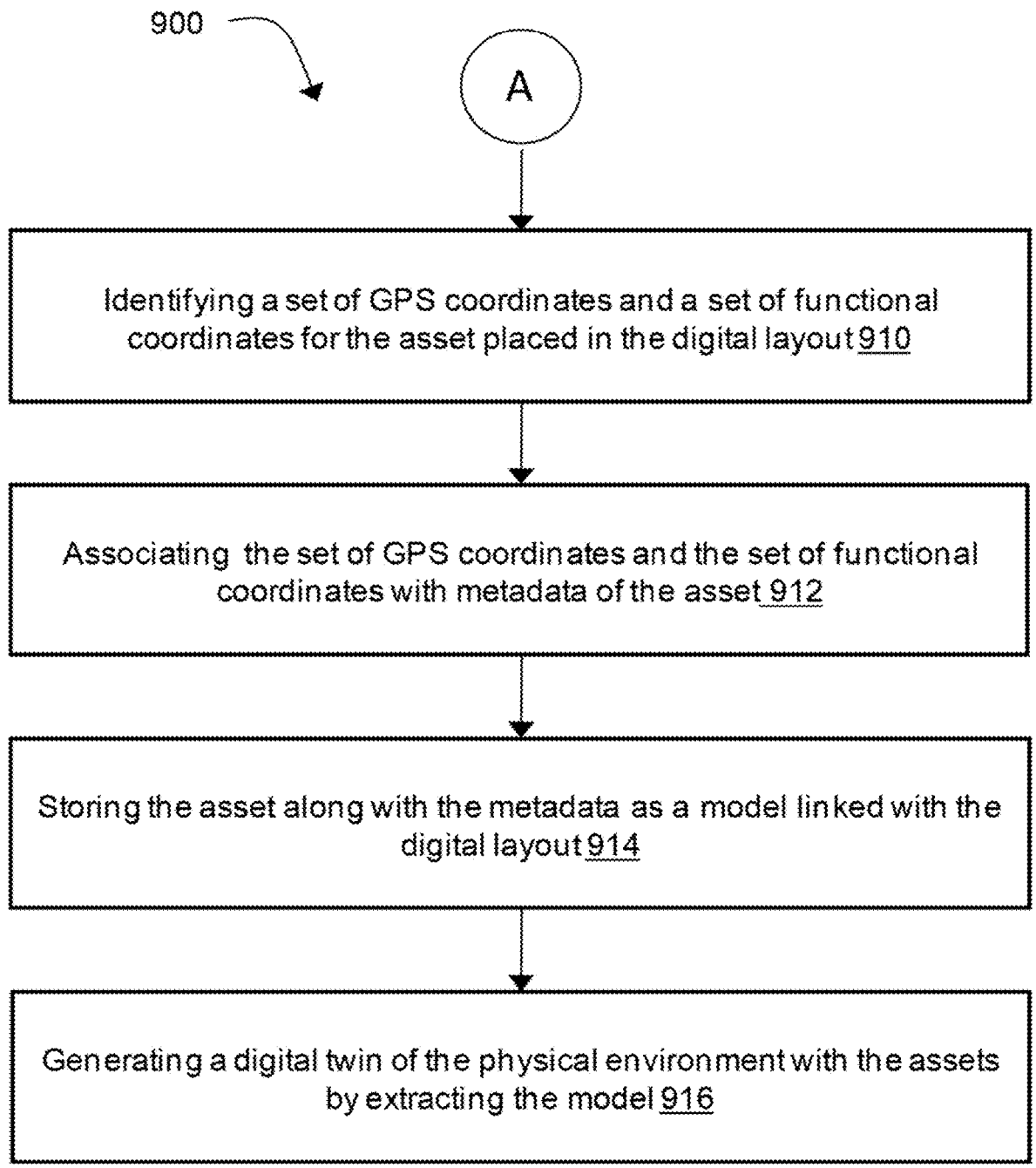

FIGS. 9A and 9B illustrate a process flowchart for extended reality environment generation, according to an example embodiment of the present disclosure.

It should be understood that method steps are shown here for reference only and other combinations of the steps may be possible. Further, the method 900 may contain some steps in addition to the steps shown in FIGS. 9A and 9B. For the sake of brevity, construction and operational features of the system 110 which are explained in detail in the description of FIGS. 1-7 are not explained in detail in the description of FIGS. 9A and 9B. The method 900 may be performed by a component of the system 110, such as the processor 120, the content receiver 130, the content pre-processor 140, and the asset linker 150.

Referring first to FIG. 9A, at block 902, digital content and metadata associated with a physical environment may be received. In an example, the receiving may include converting the digital content from two-dimensional images, two-dimensional videos, 360 degree images, CAD files, 3D models, NAVIS works, satellite images, asset bundles, point cloud data or a combination thereof, to a predefined format. Further, the metadata of the asset in the digital layout may include unique identification number for the digital layout, version number, horizontal view, position with respect to global space, dimension of one unit in the scaled-down matrix, dimension of the complete scaled-down matrix, details of all models associated the digital layout for the physical environment, GPS and function coordinates of the asset in the models and definition of placement of the digital layout in the global space At block 904, a digital layout of the physical environment may be generated by scaling the received digital content. In an example, the digital layout may be a multi-grid matrix representing scaled-down version of the physical environment.

At block 906, Global Positioning System (GPS) coordinates and functional coordinates may be associated with placement locations in the digital layout. The GPS coordinates represent actual locations of an asset in the digital layout corresponding to the physical environment and the functional coordinates correspond to relative locations of assets in the physical environment with respect to each other represented in the digital layout. In an example, a node of each grid in the multi-grid matrix is assigned the GPS coordinate and the functional coordinate for the grid.

At block 908, a pre-defined placement of an asset in the digital layout may be received. The pre-defined placement may correspond to actual placement of the asset in the physical environment and relative placement of the asset in the digital layout. In an implementation, the pre-defined placement may be defined by a user along 3 dimensional (3D) planes. Further, the user may define the pre-defined placement of the asset by plotting a boundary box for the asset in the digital layout and by providing dimensions of the asset. The received dimensions may be scaled appropriately based on scaling of the digital layout.

The method 900 of FIG. 9A continues to FIG. 9B, in which, at block 910, a set of GPS coordinates and a set of functional coordinates may be identified for the asset placed in the digital layout.

At block 912, the set of GPS coordinates and the set of functional coordinates may be associated with metadata of the asset. In an example, the metadata of the model may include unique identification number for the model, version number, details of the asset, area coordinates for the model, Euler XYZ rotation of the model, scalar value for scaling the model to a bounding box, level of the model with respect to ground level in the physical space, and offset distance of the model from the ground level.

At block 914, the asset along with the metadata may be stored as a model linked with the digital layout. The model may correspond to three-dimensional (3D) placement of the asset in the digital layout and the physical environment.

At block 916, an extended reality environment for the physical environment with the assets may be generated by extracting the model.

In an example, the method 900 may be practiced using a non-transitory computer-readable medium. In an example, the method 900 may be a computer-implemented method.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What we claim is:

1. A system comprising:
   a processor;
   a content receiver coupled to the processor, the content receiver to:
      receive digital content and metadata associated with a physical environment;
   a content pre-processor coupled to the processor, the content pre-processor to:
      generate a digital layout of the physical environment by scaling the received digital content;
      associate Global Positioning System (GPS) coordinates and functional coordinates with placement locations in the digital layout, wherein the GPS coordinates and the functional coordinates represent actual locations in the physical environment represented in the digital layout; and
   an asset linker coupled to the processor, the asset linker to:
      receive a pre-defined placement of an asset in the digital layout, wherein the pre-defined placement corresponds to actual placement of the asset in the physical environment represented in the digital layout;
      identify a set of GPS coordinates and a set of functional coordinates for the asset placed in the digital layout, wherein the GPS coordinates indicate actual location of the asset in the physical environment represented in the digital layout, and the functional coordinates indicate relative locations of assets with respect to each other in the physical environment represented in the digital layout;
      associate the set of GPS coordinates and the set of functional coordinates with metadata of the asset;
      store the asset along with the metadata representing model and metadata thereof linked with the digital layout, wherein the model represents three-dimensional (3D) placement of the asset in the physical environment; and
      generate an extended reality environment for the physical environment having the asset, based on the model.

2. The system as claimed in claim 1, wherein the content receiver is to convert the digital content from at least one of two-dimensional images, two-dimensional videos, 360 degree images, computer-aided design (CAD) files, 3D models, Navisworks files, satellite images, asset bundles, and point cloud data, into a standardized format.

3. The system as claimed in claim 1, wherein the digital layout is a multi-grid matrix representing a scaled-down version of the physical environment, a node of each grid in the multi-grid matrix being assigned the GPS coordinate and the functional coordinate for the grid.

4. The system as claimed in claim 1, wherein the asset linker is to obtain, from a user, the pre-defined placement of the assets, wherein the pre-defined placement is along 3 dimensional (3D) planes.

5. The system as claimed in claim 4, wherein the asset linker is to determine the pre-defined placement of the asset by plotting a boundary box for the asset in the digital layout and by providing dimensions of the asset, and wherein the received dimensions are scaled based on scaling of the digital layout.

6. The system as claimed in claim 1, wherein the metadata of the asset comprises at least one of a unique identification number for the digital layout, a version number, a horizontal view, a position with respect to a global space, a dimension of one unit in the scaled-down matrix, a dimension of the complete scaled-down matrix, parameters linked to models associated with the digital layout for the physical environment, GPS and functional coordinates of the asset in all the models, and a definition of placement of the digital layout in the global space.

7. The system as claimed in claim 1, wherein the metadata of the model comprises at least one of a unique identification number for the model, a version number, parameters associated with the asset, area coordinates for the model, Euler XYZ rotation of the model, a scalar value for scaling the model to a bounding box, a level of the model with respect to ground level in the physical space, and an offset distance of the model from the ground level.

8. A method comprising:
   receiving digital content and metadata associated with a physical environment;
   generating a digital layout of the physical environment by scaling the received digital content;
   associating Global Positioning System (GPS) coordinates and functional coordinates with placement locations in the digital layout, wherein the GPS coordinates and the functional coordinates represent actual locations in the physical environment represented in the digital layout;
   receiving a pre-defined placement of an asset in the digital layout, wherein the pre-defined placement corresponds to actual placement of the asset in the physical environment represented in the digital layout;
   identifying a set of GPS coordinates and a set of functional coordinates for the asset placed in the digital layout, wherein the GPS coordinates indicate actual location of the asset in the physical environment represented in the digital layout, and the functional coordinates indicate relative locations of assets with respect to each other in the physical environment represented in the digital layout;
   associating the set of GPS coordinates and the set of functional coordinates with metadata of the asset;
   storing the asset along with the metadata representing a model and metadata thereof linked with the digital layout, wherein the model represents three-dimensional (3D) placement of the asset in the physical environment; and
   generating an extended reality environment for the physical environment having the asset, based on the model.

9. The method as claimed in claim 8, wherein receiving comprises converting the digital content from at least one of two-dimensional images, two-dimensional videos, 360 degree images, computer-aided design (CAD) files, 3D models, Navisworks files, satellite images, asset bundles, and point cloud data, into a standardized format.

10. The method as claimed in claim 8, wherein the digital layout is a multi-grid matrix representing a scaled-down version of the physical environment, a node of each grid in the multi-grid matrix being assigned the GPS coordinate and the functional coordinate for the grid.

11. The method as claimed in claim 8, wherein receiving a pre-defined placement comprises obtaining, from a user, the pre-defined placement of the assets, wherein the pre-defined placement is along 3 dimensional (3D) planes.

12. The method as claimed in claim 11, wherein the receiving comprises determining the pre-defined placement of the asset by plotting a boundary box for the asset in the digital layout and by providing dimensions of the asset, and wherein the received dimensions are scaled based on scaling of the digital layout.

13. The method as claimed in claim 8, wherein the metadata of the asset comprises at least one of a unique identification number for the digital layout, a version number, a horizontal view, a position with respect to a global space, a dimension of one unit in the scaled-down matrix, a dimension of the complete scaled-down matrix, parameters linked to models associated with the digital layout for the physical environment, GPS and functional coordinates of the asset in all the models, and a definition of placement of the digital layout in the global space.

14. The method as claimed in claim 8, wherein the metadata of the model comprises at least one of a unique identification number for the model, a version number, parameters associated with the asset, area coordinates for the model, Euler XYZ rotation of the model, a scalar value for scaling the model to a bounding box, a level of the model with respect to ground level in the physical space, and an offset distance of the model from the ground level.

15. A non-transitory computer readable medium including machine-readable instructions that are executable by a processor to:
receive digital content and metadata associated with a physical environment;
generate a digital layout of the physical environment by scaling the received digital content;
associate Global Positioning System (GPS) coordinates and functional coordinates with placement locations in the digital layout, wherein the GPS coordinates and the functional coordinates represent actual locations in the physical environment represented in the digital layout;
receive a pre-defined placement of an asset in the digital layout, wherein the pre-defined placement corresponds to actual placement of the asset in the physical environment represented in the digital layout;
identify a set of GPS coordinates and a set of functional coordinates for the asset placed in the digital layout, wherein the GPS coordinates indicate actual location of the asset in the physical environment represented in the digital layout, and the functional coordinates indicate relative locations of assets with respect to each other in the physical environment represented in the digital layout;
associate the set of GPS coordinates and the set of functional coordinates with metadata of the asset;
store the asset along with the metadata representing a model and metadata thereof linked with the digital layout, wherein the model represents three-dimensional (3D) placement of the asset in the physical environment; and
generate an extended reality environment for the physical environment having the asset, based on the model.

16. The non-transitory computer-readable medium as claimed in claim 15, including the machine-readable instructions that are executable by a processor to convert the digital content from at least one of two-dimensional images, two-dimensional videos, 360 degree images, computer-aided design (CAD) files, 3D models, Navisworks files, satellite images, asset bundles, and point cloud data, into a standardized format.

17. The non-transitory computer-readable medium as claimed in claim 15, wherein the digital layout is a multi-grid matrix representing a scaled-down version of the physical environment, wherein a node of each grid in the multi-grid matrix is assigned the GPS coordinate and the functional coordinate for the grid.

18. The non-transitory computer-readable medium as claimed in claim 15, including the machine-readable instructions that are executable by a processor to obtain, from a user, the pre-defined placement of the assets along 3 dimensional (3D) planes, by plotting a boundary box for the asset in the digital layout and by providing dimensions of the asset, and wherein the received dimensions are scaled based on scaling of the digital layout.

19. The non-transitory computer-readable medium as claimed in claim 15, wherein the metadata of the asset comprises at least one of a unique identification number for the digital layout, a version number, a horizontal view, a position with respect to a global space, a dimension of one unit in the scaled-down matrix, a dimension of the complete scaled-down matrix, parameters linked to models associated with the digital layout for the physical environment, GPS and functional coordinates of the asset in all the models, and a definition of placement of the digital layout in the global space.

20. The non-transitory computer-readable medium as claimed in claim 15, wherein the metadata of the model comprises at least one of a unique identification number for the model, a version number, parameters associated with the asset, area coordinates for the model, Euler XYZ rotation of the model, a scalar value for scaling the model to a bounding box, level of the model with respect to ground level in the physical space, and an offset distance of the model from the ground level.

* * * * *